Sept. 20, 1960　　C. W. BRANDON　　2,952,985
APPARATUS FOR FRACTIONATING AND REFRIGERATING
WITH OR BY MISCIBLE FLUIDS
Filed Sept. 20, 1954　　12 Sheets-Sheet 2

Clarence W. Brandon

Sept. 20, 1960  C. W. BRANDON  2,952,985
APPARATUS FOR FRACTIONATING AND REFRIGERATING
WITH OR BY MISCIBLE FLUIDS
Filed Sept. 20, 1954  12 Sheets-Sheet 5

Clarence W. Brandon
INVENTOR.

Clarence W. Brandon
INVENTOR.

Sept. 20, 1960 C. W. BRANDON 2,952,985
APPARATUS FOR FRACTIONATING AND REFRIGERATING
WITH OR BY MISCIBLE FLUIDS
Filed Sept. 20, 1954 12 Sheets-Sheet 7

Clarence W. Brandon
INVENTOR.

Sept. 20, 1960
C. W. BRANDON
2,952,985
APPARATUS FOR FRACTIONATING AND REFRIGERATING
WITH OR BY MISCIBLE FLUIDS
Filed Sept. 20, 1954
12 Sheets-Sheet 8

Clarence W. Brandon
INVENTOR.

BY
Attorneys

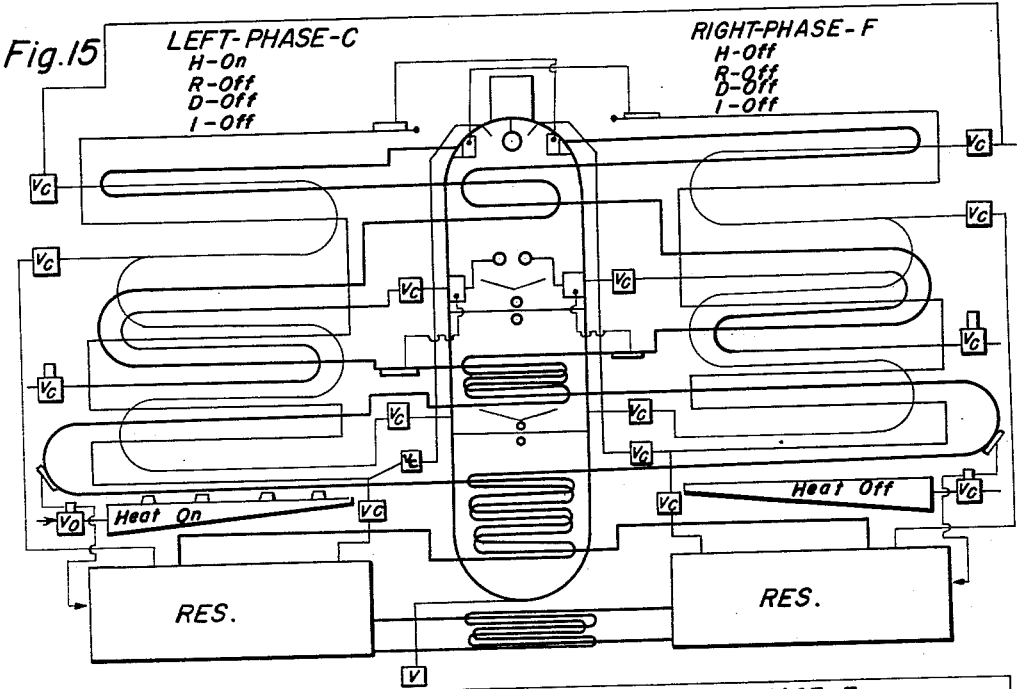
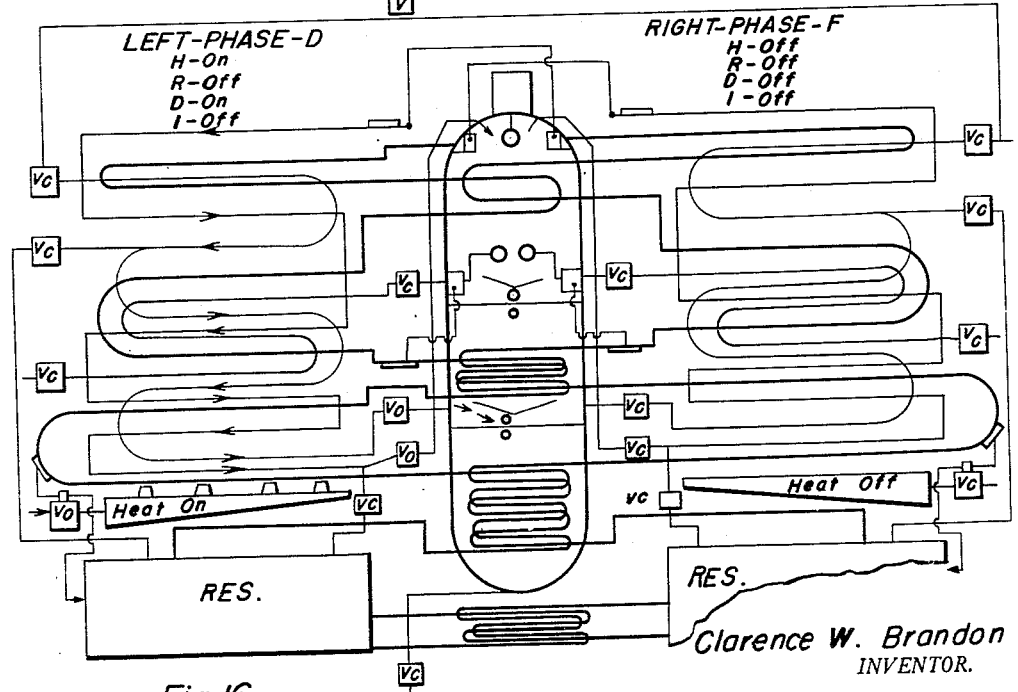

Sept. 20, 1960
C. W. BRANDON
2,952,985
APPARATUS FOR FRACTIONATING AND REFRIGERATING
WITH OR BY MISCIBLE FLUIDS
Filed Sept. 20, 1954
12 Sheets-Sheet 10

Clarence W. Brandon
INVENTOR.

BY Clarence A. O'Brien
and Harvey B. Jacobson
Attorneys

PHASES IN A COMPLETE CYCLE OF ONE UNIT

|         | A | B | C | D | E | F | G | H |
|---------|---|---|---|---|---|---|---|---|
| HEAT    | + | + | + | + | − | − | − | − |
| REFRIG  | + | − | − | − | − | − | + | + |
| DISCH'G | − | − | − | + | + | − | − | − |
| INTAKE  | + | + | − | − | − | − | − | + |

| + | ON or FLOWING |
| − | OFF or not FLOWING |

Clarence W. Brandon
INVENTOR.

Sept. 20, 1960 C. W. BRANDON 2,952,985
APPARATUS FOR FRACTIONATING AND REFRIGERATING
WITH OR BY MISCIBLE FLUIDS
Filed Sept. 20, 1954 12 Sheets-Sheet 12

Clarence W. Brandon
INVENTOR.

United States Patent Office 2,952,985
Patented Sept. 20, 1960

2,952,985

APPARATUS FOR FRACTIONATING AND REFRIGERATING WITH OR BY MISCIBLE FLUIDS

Clarence W. Brandon, 1806 S. Meridian Ave., Tallahassee, Fla.

Filed Sept. 20, 1954, Ser. No. 457,264

17 Claims. (Cl. 62—37)

This invention pertains to novel and useful improvements in a method and apparatus for fractionating and refrigerating with or by miscible fluids, being particularly applicable to hydrocarbon mixtures, and while numerous aspects and features of the invention are clearly applicable to the fractional distillation and separation of various other volatile liquids into their basic components, the instant application is primarily concerned with the utilization of this invention to separate propane, butane, pentane, and/or other mixed constituents into commercially refined form, which have been heretofore considered impractical of recovery from the waste gases generally known as "flare gas," and customarily discharged from oil wells, or gases which are lost as vapors from liquid storage tanks. In addition, certain aspects of the invention relate generally to new principles of refrigeration that are particularly useful in connection with the fractionating method and apparatus of this invention and to the vessels and equipment employed for storage and transport of volatile liquids.

The subject matter of the present application embodies several of the basic principles and represents an improvement over and a continuation-in-part of some of the subject matter of my copending application, Serial No. 39,154, filed July 16, 1948 and which matured into Patent No. 2,689,461, granted on September 21, 1954.

The flow of oil from oil wells is often accompanied by a discharge of high pressure gas, which, having been in intimate contact with the oil, is charged with the volatile lighter ends of the oil, such as methane, ethane, propane, butane, pentane, and the like, which are of very considerable fuel and commercial value and whose extraction and recovery are an important desideratum.

Previous attempts to recover these volatile ends, while theoretically feasible, have not been uniformly successful commercially, since the methods and apparatuses employed have been expensive, bulky, and cumbersome, and therefore were not economically and commercially adapted to most wells, which have a relatively low output.

Consequently, because of the frequently prohibitively expensive recovery, this high pressure gas is usually a waste product, and since it is highly inflammable and explosive, is heavier than air, and tends to accumulate at the ground level about wells throughout the oil field, it constitutes a serious hazard. Therefore, it is customarily destroyed by burning as it leaves the well, and it is sometimes known as "flare gas."

Furthermore, the flow of gas from oil bearing formations likewise includes varying proportions of the aforementioned valuable volatile components whose extraction, if economically feasible, would be desirable. In wells of relatively low output, however, as pointed out hereinbefore, such extraction is not commercially practicable.

In addition, the oil flowing from the wells contains relatively large quantities of the aforesaid volatile constituents as occluded gases as well as liquefied lighter ends, since these materials were in intimate contact under tremendous subterranean pressure. When this oil is stored and the pressure to which it was subjected in the oil bed is released, the occluded gases are released and the occluded lighter ends vaporize and escape to form a low pressure gas which is extremely rich in lighter ends of high fuel value. In view of the above mentioned conditions, however, the separation of these constituents has been heretofore impractical commercially except in particular instances.

Finally, difficulties are encountered in storing, transportion, fractionating, or subjecting the low carbon atom members of the paraffin series and the ethylene series, as well as other volatile materials such as ammonia and sulphur dioxide, because of the very high vapor pressure exerted by these materials in the temperature ranges at which these materials are ordinarily handled, thereby necessitating exceptionally high wall strength in storage vessels, with the attendant disadvantages of high cost of equipment, maintenance, weight, and so forth.

It is a fundamental purpose of this invention to overcome these deficiencies and difficulties and render efficient extraction and recovery of volatile constituents of hydrocarbon gases and vapors commercially feasible.

The primary object of this invention is to extract and recover various volatile constituents from high and/or low pressure petroleum gases and vapors in an improved and economical manner.

A further important object of the invention is to provide an apparatus and method for extracting heavier ends from gases and vapors associated with petroleum in an automatic manner which will reduce to a minimum the necessity for personal attendance and supervision by the operator.

A still further object of the invention is to provide an apparatus and method in accordance with the preceding objects which shall be efficient, economical and dependable, and will require the employment of no moving parts other than certain valves.

Yet another object of the invention is to provide an apparatus and method whereby flowing high pressure gas and/or low pressure gas may be continuously treated, and wherein the heavier ends desired to be recovered may be automatically and separately extracted and removed from said gases.

Another important object of this invention is to permit the withdrawal of the rectified components in their liquefied phase from a single rectifying vessel.

Another important object of this invention is to recover members of the paraffin series having low carbonation content in rectified form from either or both high and low pressure gaseous mixtures of the type associated with petroleum, without necessitating the use of absorption oil or the like.

Still another important object of the invention is to provide a method and apparatus in conformity with the foregoing objects wherein the sole energy required for effecting the separation of the lighter ends from the gases may be obtained from burning a fraction of these gases, or from the heat generated by recompressing waste gases for return to the natural reservoir, or by solar energy, or the like.

Still another important object of the invention is to provide a method and apparatus utilizing solely the principle that the pressure of a confined fluid increases upon the flow of heat thereinto, for pumping a fluid at a substantially constant rate of output.

Still another important object of the invention, in conformity with the immediately preceding objects, is to provide a method and apparatus utilizing the cooling effect produced by reducing the pressure upon a confined fluid together and/or with the heat of combustion of a fluid for effecting the aforementioned flow of heat and the resultant pumping action.

Another important object of this invention is to provide an apparatus and to devise a method whereby no condensers are required externally of the fractionating vessel to afford reflux or to condense the rectified product.

Another object of this invention closely allied with the immediately preceding object is to employ the same means for refluxing the material within the rectifying vessel as are utilized to condense the rectified products.

Another object of this invention is to provide an arrangement in which no pumps are required to circulate reflux material.

Yet another important object of the invention is to provide a method and apparatus for effecting the preceding objects and wherein the pressure of the gases being treated is utilized to enhance the efficiency of the operation of the apparatus and method.

Yet another object of the invention is to provide an apparatus capable of realizing the foregoing objects, which will be of large output capacity, wherein a high degree of rectification is obtained, and which will be relatively short in vertical height compared to extant devices of this character with comparable performance characteristics, so that the apparatus may be easily transported and installed intact with a maximum economy of time and manpower, and also that repair and maintenance may be accomplished without subjecting workmen to the hazards incident to working at dangerous heights.

Another important object of the invention, closely allied with the immediately preceding object, is to provide an apparatus of this character which is of relatively small horizontal extent in order to further facilitate transport and installation of the same as well as to effect an economy of space at the place of installation.

Yet another object of the invention is to provide a method and apparatus which will effect a preliminary partial rectification of the raw fluids and which will introduce the products of such partial rectification in the portions of the apparatus containing mixtures most nearly equal in constituent concentrations, and which will further rectify the fluid mixtures by causing the counter current flow of fluid in liquid phase to fluid in vapor phase through a plurality of liquid vapor equilibrium chambers.

Still a further object of this invention is to provide an apparatus for fractionating a mixture of volatile fluids into the constituents thereof, which will accomplish such fractionation while the fluids are traveling a substantially horizontal path.

A meritorious feature of the present invention resides in the provision of a U-shaped fractionating tube connecting adjacent tank compartments, and which contains throughout the length thereof means for establishing a series of liquid and vapor equilibrium chambers and the means provided for varying the effective fractionation length of the tube to control the number of bubble plate equivalents of the same, together with the legs of the tube being disposed in closely spaced, substantially horizontal planes, whereby the vertical height of the fractionating tube is minimized.

Another important feature resides in the provision of automatic means for drawing off the rectified fractions.

Final important features to be specifically enumerated herein reside in the extreme simplicity and compactness of the apparatus, which employs no moving parts other than valves and a fluid pressure actuated motor, if such is used in lieu of a simple pressure reduction safety valve, the safety features incorporated in the apparatus, and its entirely automatic mode of operation, which, together with its low initial cost, makes the installation and use of the same not only economically feasible but tantamount to being indispensable in the highly competitive field of volatile fuel production and transportation.

The foregoing and various other objects are attained by this invention, various embodiments of apparatus and methods of which have been illustrated in the accompanying drawings and described in the following specification as examples of the principles of the invention.

Reference is now made more specifically to the accompanying drawings, wherein like numerals designate similar parts throughout the various views, and wherein:

Figure 3 is a diagrammatic view, partly in vertical section, illustrating a simplified and third embodiment of the apparatus and method in accordance with the principles of the invention, and which shows the same in use for fractionating a raw gas mixture delivered to the apparatus under low pressure;

Figures 4–19, inclusive, are successive flow diagrams illustrating the operation of the apparatus shown in Figure 3.

Figures 19, 20:
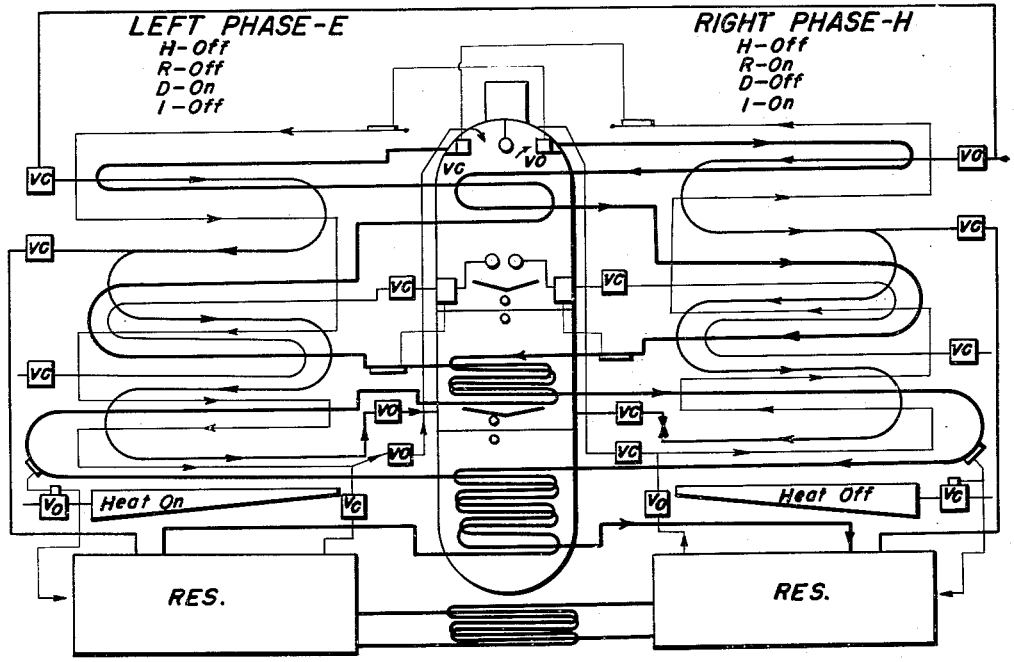
Figure 21:
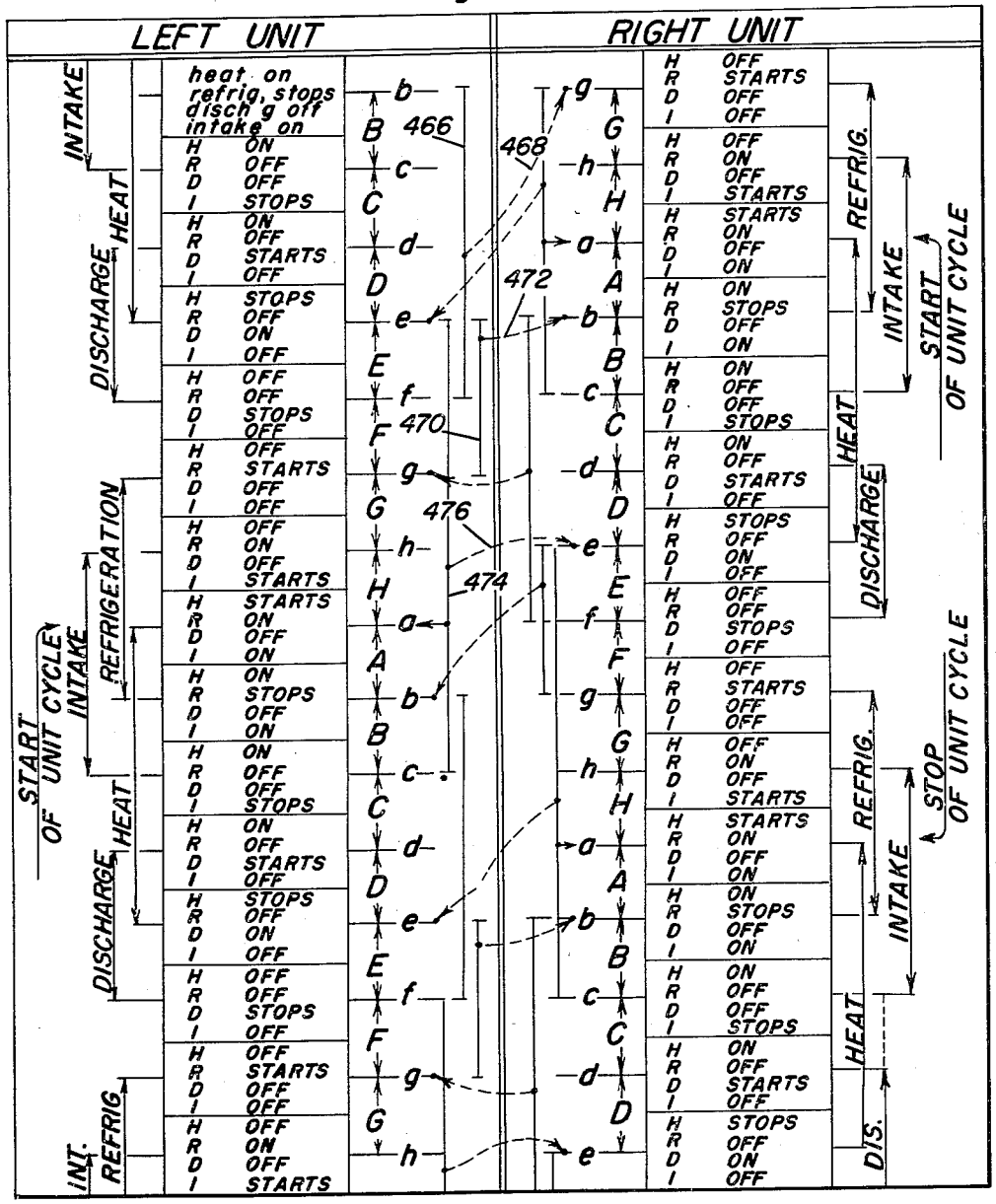

Figure 20 is a chart illustrative of the sequence of phases through which each heat exchanger unit of the apparatus of Figure 3 passes during a single unit cycle;

Figure 21 is a diagrammatic view illustrative of the mutual interdependence and flexibility of the heat and pumping heat cycles in the separate heat exchangers used by the apparatus shown in Figure 3 for maintaining a substantially constant rate of output of the apparatus; and Figure 22 is another diagrammatic view of the embodiment shown in Figure 3, and is illustrative of the manner by which the cycling of the apparatus is initiated.

The operations of the several embodiments of apparatus and the various methods in accordance with this invention and as disclosed hereinafter are predicated upon the fundamental and well known principle that under equilibrium conditions existing between a liquid mixture of miscible hydrocarbons and the vapors thereof, the mole fraction of the mixture component thereof having a higher vapor pressure will be relatively greater in the vapor phase than in the liquid phase, and upon the same general operative principles of conventional fractionating towers or columns, all of which is in conformity with Raoult's law that is generally applicable to miscible hydrocarbons with only moderate deviations therefrom; and this principle is utilized in this invention to selectively extract or draw off streams of rectified portions of the raw gas components at the temperature and pressure range which is most effective for the particular component desired.

Furthermore, the present invention utilizes the basic principle that a liquid, at any given temperature, will quite readily vaporize and diffuse into and mix with a different gas in contact with the liquid, although the pressure on the liquid exceeds the vapor pressure of the liquid, so that refrigeration effects may be produced and distillation accomplished at pressures exceeding the vapor pressure of the liquid. Finally, the present invention takes advantage of the fact that natural petroleum gases are frequently found at temperatures and pressures which, even under isothermal expansion, will undergo what is known as retrograde condensation.

Basically, the method of operation comprehends the liquefication of the components of the gas which it is desired to separate and recover from the high and/or low pressure gases delivered to the apparatus by either expanding the high pressure gas or compressing the low pressure gas, while continuously effecting the desired rectification between separate bodies of the liquid, by means of fractionating tubes which afford the sole communication between the bodies of liquid and removing the rectified components from the bodies. The requisite energy for maintaining the desired pressures and temperatures throughout each of the various embodiments illustrated is solely derived from the enthalpy of the high and/or low pressure gases received by the apparatus and the combustion of only the components of the gases which are of no commercial importance, due to the great expense of transporting the same, such as methane, which ordinarily requires a pipe line.

The non-liquefied components of the raw gases are used upon further expansion thereof for refrigeration of the apparatus, as may be required, and it is contemplated that the same may be returned to the natural reservoir from whence they came by energy derived from burning a portion of the same, together with energy derived from the pressure volume energy of high pressure raw gas upon expansion of the latter. Low pressure raw gas is pressured to the operating pressure of the fractionating portion of the apparatus and introduced thereinto by the use of the heat pump principle; that is, pumping a fluid by alternately heating and cooling a fluid contained between a pair of check valves. When once set into operation, each of the embodiments of the invention illustrated is entirely automatic in operation and controls the same as by pressure and/or thermally responsive actuated valves for an efficient and improved manner of operation.

Figure 1:
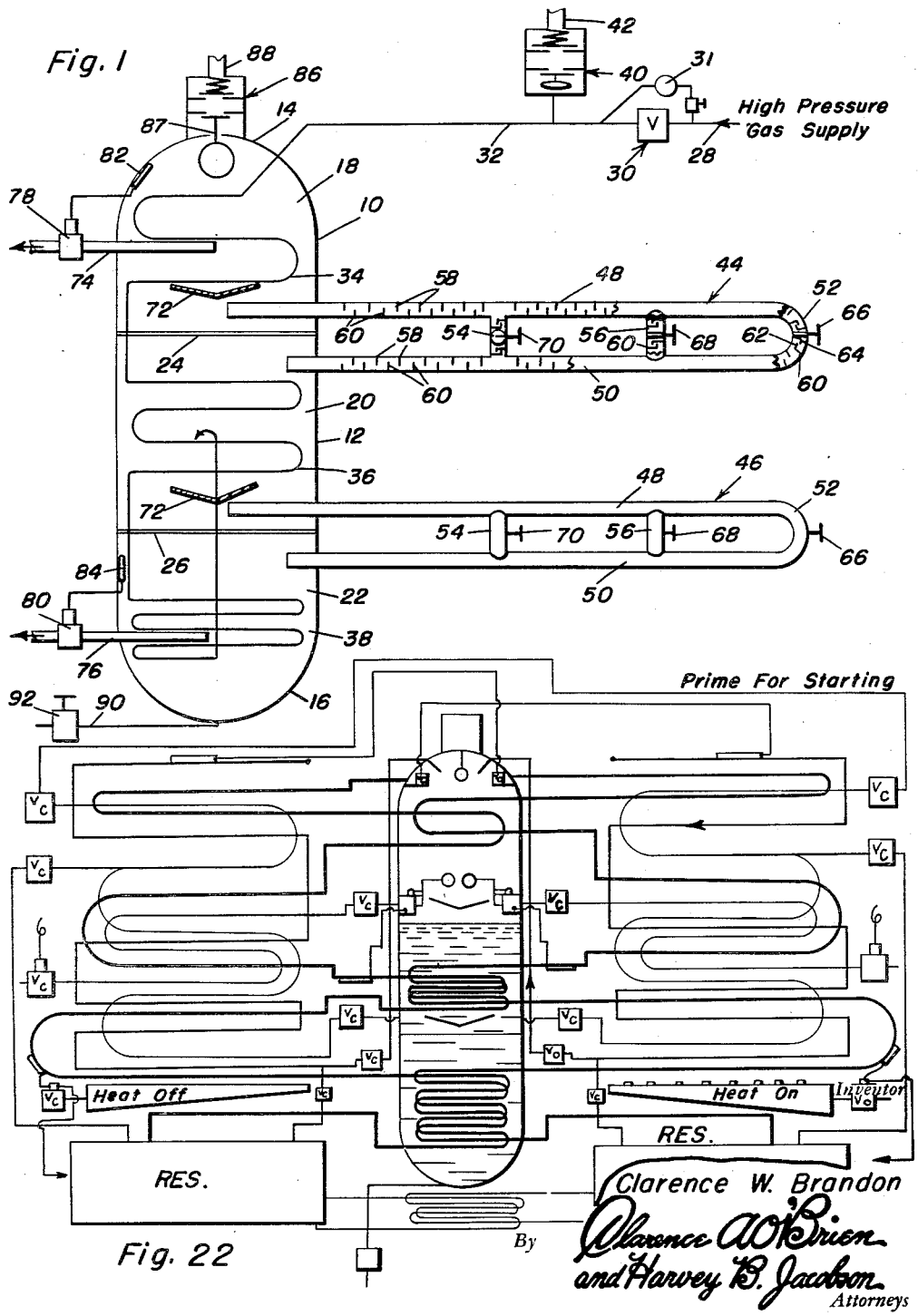
Figure 1 is a diagrammatic view illustrating a simplified embodiment of the apparatus in accordance with the principles of the present invention, and showing the same disposed for rectifying a raw gas mixture delivered to the apparatus under high pressure.

*Simplified embodiment of Figure 1*

Reference is first made to Figure 1 of the drawings, which shows a relatively simplified embodiment of the invention in order to obtain a better understanding of the fundamental principles of the same. The apparatus disclosed in Figure 1 for carrying out the operation and method contemplated by the invention consists of a tank 10, which is preferably formed as a pressure shell including an upright cylindrical portion 12 that is closed at its top and bottom ends in any suitable manner, as by semispherical end walls 14 and 16, respectively. It will be understood that the tank 10 will be constructed of suitable materials to withstand the pressures that will be maintained therein and that the same may be either insulated or not, depending upon the climatic conditions that prevail where the same is to be operated and the temperatures that are desired to be maintained therein.

In this simplified form of the invention, the interior of the tank 10 is divided into a plurality of vertically disposed compartments 18, 20 and 22 by means of substantially horizontally disposed partitions 24 and 26, which partitions will include heat insulation of any desired character, not shown, so as to insulate the compartments thermally from each other.

Indicated at 28 is a conduit communicating with a source of high pressure petroleum gas, not shown, which conducts the gas to a pressure reduction valve 30, which valve is for the twofold purpose of reducing the pressure of the gas to substantially the operating pressure within the tank 10 and also to accomplish cooling of the gas upon its expansion to condense the less volatile constituents of the same. It will be understood that the valve 30 may be of the conventional construction for pressure reduction valves suitable for use with fluids in the condensation range of pressure and temperature, and it will be appreciated that suitable equivalents of the same may be employed, such as a fluid pressure actuated motor, diagrammatically indicated at 31, that would not only accomplish the aforementioned results of a pressure reduction valve, but would also, by the extraction of shaft work from the pressure volume energy of the gas admitted through the conduit 28, enhance the cooling effect of the gases upon expansion through the motor and also provide mechanical energy that may be utilized for a purpose that will presently appear. Obviously either the valve or motor may be used alone, or both may be employed together when desired.

A conduit 32 receives the partially condensed petroleum gas from the lowered pressure side of the valve 30, which conduit 32 enters the tank 10 adjacent the upper end thereof and is disposed in a series of refrigerating coils 34, 36 and 38 that are disposed respectively in the compartments 18, 20 and 22, while the discharge end of the conduit 32 extends upwardly through the partition 26 from the last of the refrigerating coils 38 in the compartment 22 to discharge the heat laden material flowing therethrough into the central compartment or chamber 20.

Communicating with the conduit 32 intermediate the tank 10 and the valve 30 or motor 31 are means 40 for removing the portions of the gas that remain in the vapor phase and did not condense upon passage through the pressure reduction valve 30 or motor 31, so that the fluids introduced to the compartment 20 through the conduit 32 and the refrigerating coils are substantially entirely in the liquid phase and at the lowered pressure produced by the valve 30 and/or the motor 31, which means include a liquid vapor separating valve which is responsive to a pressure exceeding a predetermined value in the conduit 32 to open and permit the passage of vapor therethrough into a conduit 42, and this valve further includes the provision for preventing the passage of liquid therethrough.

It will be appreciated that it is not essential that the liquid entering the compartment 20 through the refrigerating coils 34, 36 and 38 be in the liquid phase, and may, upon a sufficient pressure drop through such coils, successively partially vaporize as this produces a refrigerating effect in the compartments 18, 20 and 22.

Communication is provided between the compartment 20 and the compartment 18 as well as between the compartment 20 and the compartment 22, including means for fractionation and rectification of the contents of the tank 10 so as to maintain the fluids within the compartment 18 relatively richer in the more volatile constituents contained in the liquid admitted to the tank 10 through the conduit 32, and the fluids contained in the compartment 22 relatively leaner in the more volatile constituents and relatively richer in the less volatile components thereof. These means comprise a pair of fractionating tube assemblies indicated generally at 44 and 46, and since these assemblies are substantially identical, it is believed that a detailed description and illustration of the internal construction of one of the same will suffice for both.

The assembly 44 comprises a pair of vertically spaced tubes 48 and 50, the inner end of the tube 48 extending into the tank 10 and terminating centrally of the compartment 18 adjacent the bottom thereof, while the inner end of the tube 50 also extends into the tank 10 and communicates with the compartment 20 adjacent the top thereof. The outer extremities of the tubes 48 and 50 are in communication through a U-shaped connector tube 52, and the tubes 48 and 50 are also in communication through the connecting tubes 54 and 56 which are spaced relative to the longitudinal dimensions of the tubes 48 and 50.

Each of the tubes 48 and 50 is preferably disposed substantially in a horizontal plane, but may in some instances be sloped downwardly and upwardly from the tank, respectively, if desired or deemed expedient, and each has therein a plurality of interdigitated baffles 58 and 60, the baffles 58 extending downwardly to terminate in spaced relationship between the upper ends of the baffles 60 and extend upwardly from the bottom of the tubes 48 and 50, the arrangement being such that the baffles 60 constitute partial dams against the flow of liquid through the tubes 48 and 50 so that a vapor passing through the tubes 48 and 50 will be passed into intimate contact with the liquid retained between the baffles 60, since the baffles 58 are disposed to extend below the surface of such liquid. The construction of the tubes 48 and 50 with the baffles 58 and 60 therein is somewhat analogous to the construction of conventional bubble towers in that such construction provides for a series of vapor and liquid interfaces for the establishment of a corresponding series of progressively different vapor and liquid equilibrium mixtures extending along the fractionating tubes 48 and 50.

The fractionating assemblies 44 and 46 are each disposed with their principal dimension being of substantial horizontal extent, so that the fractionating assemblies have a decided advantage over conventional fractionating columns in that they are of much less vertical extent for a given number of equilibrium chambers, and another important distinction between the fractionating assemblies and conventional fractionating columns resides in the fact that in the instant invention each single body of vapor defined between two immediately adjacent baffles 58 is in contact with two bodies of liquid that are separated solely by one baffle 60, whereas in the conventional bubble tower a single body of vapor is interposed between and, together with a bubble plate, separates the two bodies of liquid with which it is in contact, and therefore it will be evident that the present invention has among its advantages a space economy as well as permitting a greatly superior excellent heat exchange between immediately adjacent bodies of liquid through the separating baffles 60.

The baffles 58 and 60 continue up through each of the tubes 54, 56, and 52, so that the fractionation may be accomplished through these vertically extending tubes, and the baffles 60 in the vertically extending tubes are upturned at their outermost extremity 62 to define liquid retaining pockets into which downturned portions 64 at the outermost extremity of the baffles 58 extend, so that when the pockets defined by the baffles 60 and the upturned portions 62 are filled with liquid, a vapor passing between the baffles 58 and 60 is forced to pass beneath the surface of liquid contained therein. Valves 66, 68 and 70 are disposed in the tubes 52, 54 and 56, respectively, so that the effective fractionating length of the fractionating assemblies 44 and 46, and consequently their effective bubble plate equivalent, may be varied as desired, it being obvious that by adjustment of these valves the counter current flow of liquid and vapor in the fractionating assemblies may be proportioned as desired through any or all of the tubes 52, 54 and 56.

In a similar manner, the fractionating assembly 46 has its upper and lower substantially horizontal tubes 48 and 50 respectively communicating with the lower and central portion of the chamber 20 and with the upper portion of the chamber 22. The operation of the assembly 46 is identical with that of the assembly 44.

The arrangement of the fractionating assemblies 44 and 46 is such, with respect to the compartments 18, 20 and 22 in the tank 10, that reflux liquid flow is by gravity from the compartment through the fractionating assembly with which it is connected to the compartment immediately therebelow, and the vapor flow counter current to the reflux liquid flow is from the upper portion of the lower compartment up through the fractionating unit into the compartment immediately thereabove.

In order to approach equilibrium conditions as nearly as possible in each of the compartments between the liquid and vapor therein, the upper tube 48 of each of the fractionating assemblies 44 and 46 is disposed immediately below the apex of an apertured vapor dispensing plate 72, which plate 72 is preferably of flattened and inverted cone shape so that vapors from the inner end of the fractionating tube 48 will be dispersed laterally as it rises in the liquid contained within the compartment and formed into small bubbles by passing through the apertures in the plate 72.

Discharge conduits 74 and 76 are provided which extend into and communicate with the compartments 18 and 22 below the liquid levels thereof, respectively, for discharging the contents of such compartments. Discharge control valves 78 and 80 are provided for the conduits 74 and 76, respectively, each of said valves being controlled respectively by thermal actuators 82 and 84 disposed respectively in the compartments 18 and 22 and which valves further include pressure-responsive devices, not shown, whereby discharging through the valves 78 and 80 is not permitted except when the pressure within the tank 10 exceeds a predetermined value.

The embodiment shown in Figure 1 further includes a pressure-responsive release valve 86 in the upper end wall 14 for the release of vapors contained in the compartment 18 when the same is above a predetermined pressure and discharges the same into a conduit 88, such valve 86 including float controlled valve means 87 for preventing the flow of liquid upwardly therethrough.

The operation of the embodiment shown in Figure 1 will be readily understood. It will be appreciated that the operation of this embodiment realizes the full advantages of functioning under conditions of steady flow, and that under such conditions, by means of the conduits 28 and the valves 30 and 40, a steady stream of cool liquid, rich in the less volatile components of the raw gas mixture, is delivered to the refrigerating coils 34, 36 and 38, and thence into the compartment 20. During the passage of the liquid through the refrigerating coils, a portion of the liquid evaporates due to the progressive pressure drops during passage through the refrigerating coils due to friction factor effects, or chokes, not shown, that may be employed upstream of each of the coils, and this evaporation produces the refrigerating effects of the coils in the compartments. The portions of the liquid moving through the refrigerating coils that evaporates is entrained in the mass of liquid moving therethrough and is introduced into the compartment 20 along with the liquid.

Since raw material, both in the liquid and vapor phase, is introduced solely into the compartment 20 from the conduit 32, and also since only rectified products are removed from the compartments 18 and 22, through the conduits 74 and 76, it will be readily apparent that there is a net material flow through the fractionating assembly 44 from the compartment 20 to the compartment 18 that is equal to the quantity of discharged liquid flow in the conduit 74 and the vapor discharged through the conduit 88, and that likewise there is a net downward flow of material through the fractionating assembly 46 from the compartment 20 to the compartment 22 which is equal in volume to the liquid discharged through the conduit 76 and through the drain line 90 communicating with compartment 22 through the bottom wall 16. The drain line 90 is provided with a valve 92, which valve 92 will normally be closed during operation of the apparatus, as the primary purpose of the drain line 90 is for emptying the tank 10 of the contents for cleaning or the like.

The counter current vapor and liquid flow in the fractionating assembly 46, which is necessary for achieving the necessary rectification between the liquids contained in the chambers 20 and 22, is attained by maintaining a slightly higher vapor pressure in the compartment 22 than in the compartment 20. Such a pressure differential may be maintained by the relative refrigeration of the compartments 20 and 22 to control the relative temperatures thereof, so that the lower compartment has a higher temperature. Thus, a pressure differential existing in favor of the lower compartment causes upward vapor flow, while liquid from the upper compartment descends by gravity. In an analogous manner, counter current vapor and liquid flows are attained in the fractionating assembly 44 by virtue of a slight pressure differential in favor of the compartment 20 over compartment 18; the upward flow of vapor therethrough being fortified by the flow of vapor from the fractionating unit 46 that does not condense in the liquid mass contained within the compartment 20 and upon being chilled by the refrigerating coil 36, since the vapors from the fractionating assembly 46 that do not recondense in the chamber 20 will accumulate at the upper portion thereof and thence proceed upwardly through the fractionating assembly 44. It will be noted that the vapors proceeding upwardly from the tube 48 of the fractionating assembly 44 which do not condense in the compartment 18 in response to the refrigerating action of the coils 34 will pass through the valve 86 and the conduit 88, provided the pressure in the liquid level within the compartment 18 is such as to permit such passage. It will be further noted that such vapors that are discharged through the conduit 88 will be of the most volatile component in tank 10 and is essentially methane, which is not normally feasible for direct recovery for sale and is commonly usable only as a fuel in the immediate vicinity.

Since, with the exception of hydrostatic pressure developed in the tank 10 and the slight pressure differentials maintained between the compartments to cause the vapor flow in the fractionating assemblies 44 and 46, the pressures prevailing within the compartments 18, 20 and 22 are substantially equal, and in view of the further fact that the liquid mixtures within the compartments 18 and 22 are substantially at the vapor liquid equilibrium pressures for the mixture compositions and concentration existing therein, it will be noted that there is necessarily a temperature differential existing between each of the compartments 18, 20 and 22, and, accordingly, the temperature differential between the compartments 18 and 22 is a direct indication of the difference in composition of the liquids in these compartments that has been accomplished by the fractionating assemblies 44 and 46. Consequently, it will be evident that at predetermined temperatures existing in the compartments 18 and 22 that the desired degree of fluid rectification has been attained therebetween, and it is by the thermal actuators 82 and 84 disposed in the compartments 18 and 22 that the valves 78 and 80 are opened at such predetermined temperatures, thus assuring discharge through the conduits 74 and 76 of liquids for which such desired degree of rectification has been attained.

It is thought that the arrangement of the compartments, the fractionating assemblies, and the fact that the liquid is chilled in each compartment by the refrigerating coils produce an advantage in fractionating efficiency, which advantage, while not being essential whatever to the operation of the apparatus, is worthy of a brief description. The theoretical plate equivalent efficiency of the apparatus is believed to be markedly increased due to the fact that in the compartment 20 a chilled zone is maintained in the liquid that has relatively warm vapors overlying the same, which results in the formation of a misty or foggy zone overlying the liquid surface. It will be understood that this phenomenon is quite similar to the formation of fog in the atmosphere when warm, moist air overlies cold water. It is thought that in a short vertical distance in this misty zone that there is sufficient material interchange between the vapor and liquid phases that the equivalent of several theoretical plates is achieved. Furthermore, it is thought that the fact, that for any given liquid at a given temperature the vapor pressure is somewhat greater than the liquid is in the form of finely divided droplets, also contributes materially to the desired end result. Accordingly, it will be seen that in the present invention the number of equivalent theoretical plates in the fractionating tubes themselves is considerably reduced because of the rectification realized in the misty or foggy zone formed in each of the compartments.

It will thus be seen that there has been illustrated in the embodiment shown in Figure 1 an apparatus which will continuousuly receive petroleum gas under high pressure, then condense out the less volatile components thereof, and thereafter further rectify and divide the stream of the components liquefied into two separate streams of liquid, and between which separate streams of liquid the desired degree of rectification has been obtained by novel fractionating assemblies, each of which is adjustable as to its theoretical bubble plate equivalent, and that the desired degree of rectification is assured between such separate streams of rectified liquids by permitting discharge of the same only in response to the temperature of the desired liquid product being at a predetermined value when the liquid is at equilibrium with its vapor under a predetermined pressure. Furthermore, it will be appreciated that the embodiment shown will be much shorter in vertical height than commensurate fractionating towers with all the advantages appurtenant thereto, and it will also be appreciated that the fractionating assemblies 44 and 46 need not necessarily extend laterally from the tank 10, but may be disposed with the tubes 48 and 50 in horizontal or substantially horizontal coils either about themselves or concentric with the tank 10, so that the horizontal extent of the apparatus may be limited commensurate with the limitation of the vertical height of the apparatus without impairing their efficiency or departing from the scope of the invention. With reference to the fractionating assemblies being disposed in horizontal coils, it will be appreciated that the fractionating assemblies have been illustrated as extending laterally from the tank 10 in order to better illustrate the internal construction thereof.

As hereinbefore mentioned, the valve 30 may be replaced by or assisted by a fluid motor 31, in which case the shaft work removed therefrom may be utilized to repressure the volatile vapors discharged from the conduits 42 and 88 so as to assist in returning the same to the natural reservoir from whence the high pressure petroleum gas is delivered to the apparatus originally, thus permitting efficacious compliance with various state and federal statutes relating to the conservation of resources and materially reducing the hazards necessarily incident to the discharge of the same into the atmosphere or the burning of the same in the vicinity of apparatus handling combustible materials.

It should also be observed that the refrigerating coils disposed in the compartments serve the dual functions of condensing vapors for reflux through the fractionating assemblies 44 and 46, and also for condensing the vapors to be discharged from the apparatus as liquids through the conduits 74 and 76.

Obviously, while not considered necessary, such supplementary heating and/or refrigerating means and conventional automatic control means therefor may be provided to maintain each portion of the apparatus at the desired operating temperature whatever such provision may be deemed advisable or considered expedient, with a view to the over-all efficiency of the apparatus.

Figure 2:
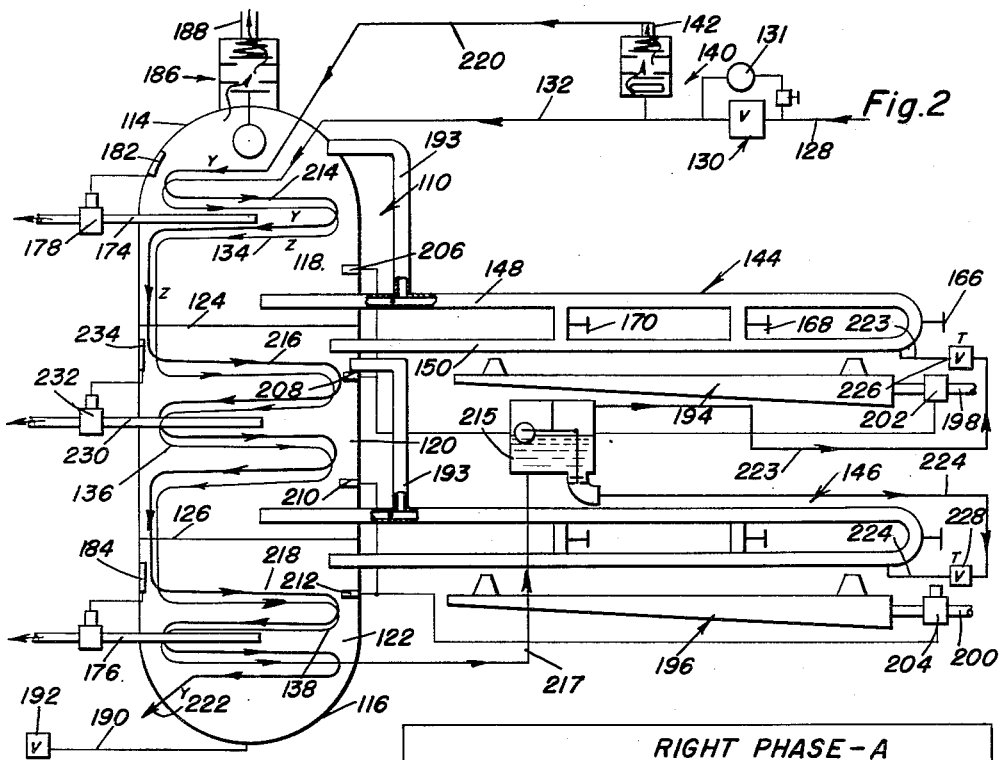
Figure 2 is another diagrammatic view similar to Figure 1, but of a slightly more complex and second embodiment of the invention.

*Embodiment of Figure 2*

Attention is now directed to the embodiment of the invention illustrated in Figure 2, such embodiment including all of the features shown in Figure 1 and described hereinbefore, together with further features to be presently described, and in this connection it will be noted that the reference numerals 110 through 192, inclusive, in Figure 2 designate substantially similar parts as those indicated by the reference numerals 10 through 92, inclusive, of Figure 1, to which the numerical value of 100 has been added. The embodiment illustrated in Figure 2 is an improvement over that shown in Figure 1 by virtue of having incorporated therewith heater burners for the fractionating assemblies and the inclusion of means responsive to temperature differentials existing between compartments between which communication is afforded by the fractionating assembly heated thereby for limiting the amount of fuel admitted to the burners, so as to maintain a reflux control on the fractionating assemblies for showing a constant degree of rectification between the chambers. In addition, further means are provided for refrigerating the contents of the compartments, together with means for selectively introducing materials that are subjected to a preliminary rectification into the fractionating assemblies. And finally, the fractionating assemblies are modified somewhat and means are provided for withdrawing liquid from the central compartment.

Fractionating assemblies 144 and 146 differ from the assemblies 44 and 46 in that conduits 193 are connected between the tube 148 at a position adjacent the tank and the corresponding compartment above the liquid level therein, so that the rising vapor streams in the assemblies 144 and 146 pass directly into the upper portions of the chambers 118 and 120, respectively.

Heaters 194 and 196 for the assemblies 144 and 146, respectively, are provided, to which burners fuel is supplied through pipes 198 and 200, respectively, the rate of fuel admission to the burners through the pipes 198 and 200 being controlled by valves 202 and 204. As stated in connection with the explanation of the operation of the embodiment disclosed in Figure 1, it is by virtue of the differences in quantitative concentration of the miscible components in the liquid mixtures in the compartments and the fact that the compartments are under nearly equal pressures that there is a temperature differential between compartments. In other words, as is well known in the hydrocarbon fractionation industry the temperature differential existing between compartments is an indication of the degree of rectification that has been attained between the compartments, and since the activity of the fractionating assemblies communicating between these compartments is also directly related to the degree of rectification existing between the compartments, a direct interrelation for the purpose of controlling the fractionating assemblies as to the rate of their operation or activity is established by the temperature differential existing between the compartments that are communicated between by the fractionating assembly and the rate of admission of fuel to the associated burner for the fractionating assembly, which interrelation is established by the provision of temperature differential responsive actuation means for the valves 202 and 204 that include thermal responsive devices 206 and 208 in the compartments 118 and 120, respectively, that are associated with the valve 202 to control the latter in response to the temperature differential between such compartments, and thermal sensitive devices 210 and 212 similarly associated with the valve 204. Accordingly, it will be seen that the rate of heat input into either of the fractionating assemblies 144 and 146 is directly dependent upon the relative concentrations of miscible materials in the compartments communicated between by the respective fractionating assemblies, so that their rate of reflux is directly controlled thereby.

Since, by the inclusion of the burners 194 and 196 in this embodiment, energy in the form of heat is introduced into the fluids contained within the apparatus, additional means have been provided for cooling the mass of liquids contained within the compartments 118, 120 and 122, which means include disposing further refrigeration coils 214, 216, and 218 in the compartments 118, 120 and 122, respectively, which refrigeration coils are disposed in series with the inlet end of the refrigerating coil 214 communicating through a conduit 220 with the conduit 142 for receiving the vapor discharged from the valve 140 and the discharge end of the refrigerating coil 218 communicates through conduit 222 to the outside of the tank 110. It will be evident that refrigeration effects will be produced in the compartments by the further refrigerating coils provided, since the gaseous discharge from the valve 140 will further expand due to the pressure dropping in the refrigerating coils due to the friction factor losses of the same and the external lowered pressure with which conduit 222 is in communication.

It will be noted that in both the embodiments shown in Figures 1 and 2, expansion valves, not shown, may be disposed upstream of each of the refrigerating coils and/or the relative effective length of each of the refrigeration coils may be adjusted to effect and proportion the desired refrigerating effect in the individual compartments.

Means are provided to effect a preliminary rectification of the hydrocarbons condensed upon passage through the pressure reduction valve 130 and/or the fluid pressure motor 131, which includes passage of the condensed vapors successively through steps of pressure reduction in coils through the compartments 118, 120, and 122, thus by the Joule Thomson effect absorbing heat from the compartments 118, 120, and 122. Then after passage of the condensed vapors through the compartments for refrigerating effects, they are conducted by line 217 to separator valve 215, thereafter being divided into vapor line 223 and liquid line 224 each going to valves 226 and 228, respectively, for controlling the admission of fluid from the charging line 217 to the fractionating assemblies 144 and 146, respectively. Since the contents of the fractionating assembly 144 will normally have therein relatively more volatile mixtures than those contained within the fractionating assembly 146, as the fractionating assembly 144 is disposed further along the upward path of vapors proceeding upwardly through the apparatus, it is desirable that the materials introduced into the fractionating assembly 144 and the charging line 217 be also relatively more volatile than the materials introduced into the fractionating assembly 146. For this purpose, the valve 215 is, in the preferred construction, in the nature of a separating valve so that approximately all of the vapors formed in the charging line 217 during the passage of the volatile fluids through the refrigerating lines in compartments 118, 120 and 122, will be introduced into the fractionating assembly 144 through the line 223. Accordingly, it will be seen that by the use of the valve 215 a preliminary separation of some extent is attained between the components of the volatile liquid prior to entering the fractionating apparatus. It will be noted that the lines 223 and 224 communicate with the fractionating assemblies substantially at their outermost extremities, so that further separation is accomplished between the materials introduced prior to the same entering the tank 110 through the tubes 148 and 150.

By means of the valves 215, 226 and 228, it will be readily apparent that condensates formed upon passing through the pressure reduction valve 130 or the motor 131 may be both selectively and proportionately introduced as desired into the fractionating assemblies, without contaminating the products of the compartments 118, 120 or 122.

As in the embodiment shown in Figure 1, a discharge conduit 174 is provided for discharging the more volatile liquid fraction from the upper compartment 118, and a discharge conduit 176 for discharging the relatively less volatile liquid fraction from the lower compartment 122; however, in the embodiment shown in Figure 2, a similar discharge conduit 230 is provided for discharging the intermediate liquid fraction contained in the compartment 120, together with a control valve 232 therefor and which has, in an analogous manner, a thermal actuator 234 disposed in the central chamber 120, which thermal actuator 234 operates in a manner similar to the thermal actuators 182 and 184 to control the valve 232. The means provided for discharging the intermediate fractions contained in the central compartment 120 are included in this embodiment, since it is frequently desirable to produce intermediate fractions, and it will be appreciated that by the provision of the discharge conduit 230 it is not necessary to blend the fluids discharged from the conduits 174 and 176 to produce such intermediate fractions or blends.

The operation of the embodiment shown in Figure 2 will be readily understood when taken together with the description of the operation of the embodiment shown in Figure 1, since this somewhat more complex embodiment operates entirely upon the same principles as the simple embodiment, and differs only in that means have been provided for heating the fractionating assemblies to an extent controlled for each fractionating assembly by the degree of rectification attained between its extremes, or, more accurately stated, the composition of the liquid in one compartment compared to the composition of the vapor in the compartment therebelow, and also by the means by which partially rectified portions of the raw feed may be selectively introduced into the fractionating assemblies and the additional means provided for educting intermediate fractions from the apparatus.

*Embodiment of Figures 3–22*

Attention is now directed to the embodiment of the invention illustrated in Figures 3–22, which embodiment, while including certain features disclosed in Figures 1 and 2, is particularly adapted for rectifying and recovering desirable components of low pressure hydrocarbon gas mixtures, whose pressure is insufficient to attain the desired condensation of the heavier, less volatile components thereof upon further reduction of the pressure of the same and/or insufficient for introducing the same into the tank compartments and the fractionating assemblies. It is of paramount importance that it be understood at the outset that while this embodiment has been illustrated as only processing low pressure gases, the same is entirely capable of processing high pressure gases simultaneously with the processing of the low pressure gases by the methods and apparatus to be hereinafter described.

In order to facilitate a readier comprehension of the apparatus illustrated in Figure 3 and the method by which it operates, it will be pointed out here that the pumping of low pressure raw vapors feed material into the fractionating portion of the apparatus, and raising the pressure of the gas to the operative pressure of the fractionating apparatus is accomplished by the use of the well known heat pump principle, which, as will be seen presently, involves the use of a heat exchanger, the temperature of which heat exchanger is fluctuated in order to effect the aforementioned pumping action. By means to be presently described, the heat exchanger is periodically refrigerated through the agency of a portion of the fluid in the main tank passing therethrough while expanding and vaporizing, and the heat exchanger is also periodically heated by the combustion of waste vapors from the fractionating apparatus to bring about the necessary temperature fluctuations within the heat exchanger.

A main tank or shell 300 is provided, which preferably is formed of vertically extending cylindrical side walls 302, closed at the upper end by a hemispherical top wall 304 and at the bottom by a hemispherical bottom wall 306. As in the other embodiments already described, the interior of the tank 300 is divided into an upper compartment 308, a central compartment 310, and a lower compartment 312 by heat insulating partitions 314 and 316 of any suitable character. In this embodiment of the invention, it is presumed that the operating temperature of the tank 300 will be above atmospheric temperature, and the walls of the tank 300 will not be insulated so that there will be good heat exchange between the atmosphere and the contents of the interior of the tank 300 for cooling of the same and in order that there may be upwardly moving convection currents of air about the tank 300 for a purpose to be presently apparent. However, in the event the apparatus shown in Figure 3 is to be used in a hot climate, or it is deemed advisable that the tank operate at or below the atmospheric temperature, it will be evident that additional refrigerating means can be employed to maintain the tank 300 and its contents at the desired temperature.

A fractionating assembly 318 is provided which communicates between the central chamber 310 and the upper chamber 308, and another fractionating assembly 320 is likewise provided that communicates between the central chamber 310 and the lower chamber 312; the fractionating assemblies 318 and 320 being indicated in the drawings diagrammatically, since it will be understood that in the preferred construction of this embodiment the fractionating assemblies 318 and 320 will be the full counterparts of either of the types of the fractionating assemblies illustrated and described in the embodiments shown in Figures 1 and 2, and it will be further understood that should the use of the same be expedient in this embodiment, a heater will be provided for each of the fractionating assemblies, the control of such heaters being responsive to the control means described in connection with the embodiment shown in Figure 2. The aforementioned elements have been omitted from the drawing illustrating the present embodiment, since inclusion of the same would simply obscure other salient features of the present embodiment that have not as yet been described.

There are a pair of auxiliary tanks or reservoirs 322 and 324 associated with the main tank 300 as well as a pair of heat exchangers, the latter of which are shown diagrammatically in dotted outline and indicated generally at 326 and 328.

Indicated at 330 is a low pressure gas feed conduit which is connected to a source of low pressure gas, not shown, such as low pressure oil and/or gas wells, the top of liquid hydrocarbon storage tanks, etc. The conduit 330 is branched to a pair of non-return check valves 334 and 336, which valves 334 and 336 communicate with raw material input coils 338 and 340, respectively, which are disposed in heat exchange relationship in the heat exchangers 326 and 328, respectively, and through which communication is had through further non-return check valves 341 and 342, respectively, to the interior of the central tank compartment 310. It will be understood that the arrangement of the coils 338 and 340 and the check valves 334, 336, 341 and 342 is such that fluctuations of temperature in either of the heat exchangers 326 and 328 will cause movement of fluid from the conduit 330 into the central compartment 310 by the well known heat pump principle.

Each of the heat pump input coils 338 and 340 is also provided with means whereby the discharge therefrom may be pumped to one of the reservoirs and/or the central chamber 310, these means comprising lines 343 and 344 of which the former communicates between the coils 338 and the reservoir 322 and the latter communicates between the coil 340 and the reservoir 324, non-return control valves 346 and 348 being placed in the lines 343 and 344, respectively, for controlling the proportion of the total amount of fluids pumped through the heat pump coils 338 and 340, respectively, that is delivered to the reservoirs 322 and 324, it being understood that the valves 341 and 342 may be turned off entirely if desired. Although such construction is not shown, the lines 343 and 344 may, if desired, be connected to either or both the fractionating assemblies 318 and 320 as in the embodiment of Figure 2 and/or to the reservoirs 322 and 324, whereby the raw material from the conduit 330 may be introduced directly into the fractionating tubes.

Means is provided for pumping fluid contained in the reservoirs 322 and 324 into the main tank 300, which contents, as will be seen presently, not only include the fluid introduced thereinto through the lines 343 and 344, but also fluids that are introduced into the reservoirs during the refrigerating cycles of the heat exchangers 326 and 328, which means include a heat pump coil 350 disposed in the heat exchanger 326, the inlet end of which communicates with the reservoir 322 through a non-return check valve 352, and the upper free end of which is closed, as at 351.

The inlet end of a line 353 communicates with the coil 350 adjacent its lower end and above the valve 352 and is arranged to discharge into the compartment 308. The line 353 is provided with a check valve 354, the arrangement being such that upon cooling the coil 350, material in the reservoir 322 will be drawn up into the coil 350, and that upon heating the coil 350 the pressure so generated will force material from the coil 350 through the valve 354 and the line 353 into the compartment 308. As will be obvious, the valves 352 and 354 are arranged so that flow through the coil 350 can only occur in the direction that permits fluid in the reservoir 322 to be pumped into the interior of the compartment 308, whereby alternate heating and refrigeration of the heat pump coil 350 will pump fluid from the reservoir 322 into the tank 300. It will be noted that only the coolest part of the material and whatever portions of the same that are in the liquid phase will be forced from the coil 350 into the line 353, it being also noted that the line 353 is disposed outside the heat exchanger 326 so that the materials therein will have an apportunity to be cooled considerably before entering the compartment 308.

In a precisely analogous manner, a second heat pump coil 356 having a closed end is disposed in the heat exchanger 328, which coil communicates with the reservoir 324 through a check valve 358. A line 357 communicates between the heat pump coil 356 and the compartment 308 through a check valve 360, so that fluctuations in the temperature prevailing in the heat pump coil 356 will pump the fluids contained in the reservoir 324 into the tank 300, as will be apparent.

Separate means are provided for heating each of the heat exchangers 326 and 328, which means include a heater 362 for the heat exchanger 326 and a heater 364 for the heat exchanger 328. Heater fuel admission lines 366 and 368 are provided for the heaters 362 and 364, respectively, which admission lines are provided with control valves 370 and 372, respectively. By means to be presently described, the control valves 370 and 372 are actuated for alternate heating of the heat exchangers 326 and 328, which means are responsive to certain thermal interdependence of the heat exchangers 326 and 328 to also be described shortly.

Means are provided to periodically refrigerate the heat pump coils 338, 340, 350, and 356 in the heat exchangers 326 and 328, and the interior of the compartments 308, 310 and 312, which comprises two similar but separate refrigeration circuits. The first of such refrigeration circuits comprises refrigeration coils 374, 376, 378, 380, 382 and 384, which coils are connected in series in the order enumerated, with the coil 374 being disposed in the heat exchanger 326 in heat exchange relationship with the heat pump coils 338 and 350 and having its inlet end communicating with the interior of the compartment 308 below the liquid level thereof, with the outlet end of the coil 384 discharging into the reservoir 322 as at 386. As clearly shown in the drawings, the refrigeration coils 376, 380 and 384 are disposed in the compartments 308, 310 and 312, respectively, while the refrigeration coils 374, 378 and 382 are disposed in the heat exchanger 326 so as to be in heat exchange relationship with the heat pump coil 350, it being also noted that the coils 374 and 378 are also in heat exchange relationship with the raw material input heat pump 338.

As will presently appear, the pressure within the reservoir 322 will normally be below that of the pressure within the tank 300, so that liquid within the compartment 308 may be expanded with suitable valve means in the refrigeration coils to refrigerate the interior of the compartments 308, 310 and 312 together with the heat pump coils associated therewith.

In order to periodically permit a discharge of liquid from the compartment 308 and its expansion through the refrigeration coils into the reservoir 322, a valve 388 is disposed at the inlet of the refrigeration coil 374, which valve 388 is responsive to the pressure within the compartment 308 exceeding a predetermined value and the temperature of the heat pump coil 356 exceeding a predetermined value to open the same, which means include a thermal actuator 390 associated with the heat pump coil 356, as clearly shown in the drawings.

A second refrigeration circuit is analogous to the refrigeration circuit associated with the heat exchanger 326, being associated with the heat exchanger 328 and includes a series of refrigeration coils 392, 394, 396, 398, 400 and 402 communicating with the interior of the compartment 308 and the reservoir 324, the coils 394, 398, and 402 being disposed in the compartments 308, 310 and 312, respectively, with the coils 392, 396, 400 being disposed in the heat exchanger 328 and in heat exchange relationship with the heat pump coils 340 and 356. A control valve 404, which is a counterpart of the valve 388, is disposed in the inlet end of the refrigeration coil 392, and is likewise responsive to pressure above a predetermined value within the compartment 308 and is responsive by means of a thermal actuator 406 associated with the heat pump coil 350 to a predetermined temperature of the heat pump coil 350 to open the valve 404 for the admission of liquid from the compartment 308 and its expansion through the refrigeration coils into the reservoir 324.

Means are provided to continuously cool the contents of the reservoirs 322 and 324, which includes convection coils 408 and 410 communicating between the upper portion and the lower portion of the reservoirs 322 and 324, respectively, which coils are cooled and circulation caused therein by the same being disposed below the tank 300 to be in an air convection draft induced by the temperature of the tank 300. It will be apparent that a downward circulation of fluid is induced in the convection coils 408 and 410 by the cooling of the fluids therein, so as to cool the entire contents of the reservoirs 322 and 324. It will be understood that if a more effective refrigeration means for the reservoirs is necessary to maintain the temperatures of the reservoirs at sufficiently low values to insure the pressure therein being lower than the main tank 300 pressure so that effective cooling flow in the heat exchanger refrigeration coils is assured, such refrigeration means, not shown, may be employed which may conveniently be of the absorption type, since the same may be easily supplied with heat energy by burning a portion of the light end of vapors removed from the apparatus.

A gas discharge line 412 communicates with the upper end of the compartment 308, which line 412 is provided with valve means 414 that will permit the flow of gas from the compartment 308 to the line 412 upon the pressure therein exceeding a predetermined value, but which valve 414 includes a float actuated element 415 that prevents the escape of liquid therethrough.

Although the apparatus shown in Figure 3 is shown as having only three compartments therein, it will be evident that the principles of this invention would be applicable to an apparatus including any desired number of vertically spaced compartments and that means may be provided for withdrawing fluid products from any or all of such compartments. In order to discharge liquid fractions from the compartment 308 (it being understood that similar means could be associated with any number of compartments in similar apparatus), means is provided which includes valve assemblies 416 and 418 disposed in the compartment 308 and which communicate respectively with discharge lines 420 and 422. Non-return valve assemblies 416 and 418 are of the type that are closed whenever the liquid level within the compartment 308 is below the floats 424 and 426 associated therewith, respectively, and which will open in response to pressures exceeding predetermined values within the compartment 308 and upon response to the thermal actuators 428 and 430 being exposed to predetermined temperature range, the thermal actuators 428 and 430 being associated with the valve assemblies 416 and 418, respectively. It will be noted that the actuators 428 and 430 are in thermal contact with the refrigeration coils 378 and 396, respectively, so that flow in the lines 420 and 422 can occur only when the refrigeration coil of the unit associated therewith is at a temperature below a predetermined level. Obviously, if desired, the line 420 may be extended in thermal contact with the refrigeration coil 378 to effect the further cooling of the products being drawn off. The line 422 may also be arranged in an analogous manner. It will be evident that such an arrangement can result in cooling the products being drawn off for the simple reason that products are only being drawn off when the refrigeration coil associated therewith is actually cooled. Thus, it will be seen that opening of either of the valve assemblies 416 and 418 is dependent upon the level of the liquid contained within the compartment 308, the pressure within the compartment 308 and the temperature of the thermal actuator with which the valve assembly is associated, whereby, as will presently appear, the valve assemblies 416 and 418 are alternately opened so that a substantially continuous liquid discharge is maintained from the compartment 308 through the lines 420 and 422 considered together. In addition, the discharge lines 420 and 422 may extend separately to storage facilities or may be joined as a common fluid transmission line for transport to near or remote storage facilities or points of use, now shown.

In order to discharge fluid from the lower compartment 312 and to permit drainage of the tank 300, whenever necessary, a conduit 444 communicates with the bottom of the compartment 312 through a valve assembly 446. The valve assembly 446 includes a valve 448 carried by a valve plunger 450. A standard 452 extends above the refrigerating coils 384 and 402 and has pivoted to the upper extremity thereof a float arm 454 that carries a float 456 at its outer end. The upper end of the valve plunger 450 is pivotally connected to the float arm 454 intermediate the ends of the arm, so that liquid rising above a predetermined level in the compartment 312 will raise the plunger 450 and the valve 448 to open the valve assembly 446 and allow the passage of liquid from the chamber 312 to the conduit 444. An additional valve 458 is provided in the conduit 444 for controlling the discharge therefrom.

Attention is now directed to the means provided for actuating the heater fuel valves 370 and 372. The valve 370 is opened in response to a thermal actuator 460 that is thermally associated with the refrigerating coil 382, which thermal actuator 460 will open the valve 370 upon the temperature of the coil 382 dropping to a predetermined low refrigerated level, and the valve 370 is closed in response to a thermal actuator 464 thermally associated with the refrigerating coil 400 which will, upon the refrigerating coil 400 dropping to a predetermined low temperature, close the valve 370. Similarly, the valve 372 is opened in response to the refrigerating coil 400 cooling to a predetermined low level by means of a thermal actuator 464 associated therewith, and the valve 372 is closed in response to the coil 382 cooling to a predetermined temperature, by means of the thermal actuator 460, that, it will be recalled, is thermally associated with the refrigerating coil 382. Accordingly, it will thus be seen that the flow of heat into one of the heat exchangers is initiated in response to a refrigerating coil associated therewith dropping to a predetermined low temperature, and this flow of heat is terminated in response to a refrigerating coil associated with the other heat exchanger dropping to a predetermined low temperature. By the dependence of the initiation of the admittance of heat to either of the heat exchangers upon the temperature of the refrigerating coil directly associated therewith and also by virtue of the termination of the introduction of heat being dependent upon the temperature of the refrigerating coil directly associated therewith, and in further view of the interdependence of the refrigeration for the heat exchangers established by the thermal actuators being associated with the heat pump coil of the heat exchanger other than the heat exchanger to which the refrigerant expansion valve is associated, alternating heating phases and refrigerating phases for each heat exchanger are established and they are directly related to each other.

It will be noted that the flow of fluid through all coils or conduits extending through the heat exchangers is unidirectional, with the exception of the heat pump coils 350 and 356, and in Figure 3 the direction of flow permitted through each of such coils and conduits is indicated by flow arrows.

Since the heat pump coils 338 and 350 are subjected to substantially identical temperature potentials during the same time intervals, since they are disposed in the same heat exchanger 326, it will be assumed, for the purposes of clarity and easier understanding, that the initiation and termination of the discharge and intake phases of the heat pumps of which they form the operating portion thereof will coincide. It will also be assumed that the discharge and intake phases of the heat pumps that include the coils 340 and 356 likewise coincide for the same reasons and purpose.

For the purpose of explaining the entire sequence of steps or phases through which the apparatus, as a whole, passes, it will be necessary, even making the presumptions of the preceding paragraph, to explain the phases through which each of the cooperating units passes, such a unit being considered to be one of the heat exchangers and all of the fluid conduits and the heat pump coil directly associated therewith. This is all the more necessary in view of the adjustable interrelations with respect to time between the initiation and termination of the various corresponding phases between the units to be presently set forth.

The chart shown in Figure 20 is of material assistance in comprehending the sequence of phases existing in one of such units during one complete cycle of the unit. In the chart shown in Figure 20, the phases are designated by the capital letters A through H, which phases occur in sequence in the alphabetical order of the same, and the operating conditions during each of such phases, for example, as to the heater being "on" or "off," refrigeration taking place in the coils communicating between the upper compartment and the reservoir, the heat pumps discharging into the tank, and the heat pumps drawing in a first charge being indicated in rows. For instance, in the row designated as "heat," a plus sign in the column of a particular phase indicates that the burner associated with the unit is "on," while a minus sign signifies that such burner is "off." A plus sign in the refrigeration row indicates that there is flow occurring in the refrigerating coils communicating between the main tank and the reservoir to produce a refrigerating effect, while a minus sign indicates that such flow is not occurring. A plus sign in the row designated "discharge" signifies that the heat pumps are discharging their contents received from both the source of low pressure gas and the reservoir into the main tank, while a minus sign in this row signifies that such discharge is not taking place. A plus sign in the row indicated "intake" indicates that the heat pumps are receiving or sucking fluid from the source of low pressure gas and the reservoir associated therewith, while a minus sign indicates that such intake is not occurring.

Thus, choosing phase "A" arbitrarily in the cycle of one of the units as an initial point, it will be seen that during this particular time interval, that the burner is on, there is refrigeration flow in the refrigerating coils and that the heat pumps are not discharging but are receiving fluid. It will be noted, upon inspection of Figure 20, that of the four variables, that is, heat, refrigeration, discharge and intake, that it is assumed that a change of any one of these variables designates a change of phase to simplify explanation of the sequence. Accordingly, the transition of the unit from phase "A" to phase "B" is marked by the cessation of the flow of refrigerating fluid. As will be explained later, the reason for the refrigeration flow ceasing, so as to initiate phase "B," is a dependent relation upon the phase condition of the other unit.

The transition from phase "B" to phase "C" resides in the cessation of the intake, which cessation is brought about by the continued application of heat and the refrigeration having stopped, it being noted in this respect that the application of heat and the application of refrigeration are, in effect, the opposed motivating forces or potentials effecting the discharge or intake phases of the heat pumps.

The transition from phase "C" to phase "D" resides in the initiation of the discharge of the heat pumps, which discharge is initiated by the continued application of heat, as will be readily apparent.

The transition from phase "D" to phase "E" resides in turning off of the heater burner, which, as will be subsequently explained, is directly controlled by the other unit.

The transition from phase "E" to phase "F" resides in the cessation of the discharge flow of the heat pumps, which cessation necessarily follows the cessation of the motivating force of the discharge, which, of course, is the application of heat.

The transition from phase "F" to phase "G" resides in the initiation of refrigerating flow in the unit, which, as will be explained subsequently, is initiated in response to an occurrence in the other unit.

The transition from phase "G" to phase "H" resides in the initiation of the intake cycle of the heat pumps, which necessarily follows the initiation of the motivating force of such intake, which is, of course, the refrigerating flow in the heat exchanger.

The transition from phase "H" to phase "A" resides in the turning on of the heater burner, which is, as will be subsequently explained, brought about in response to a temperature condition existing in the refrigerating coils of the same unit. Of course, phase "B" will then follow phase "A," and the operation will repeat itself in the sequence set forth above.

It will be evident, from the foregoing, that in order to insure the sequence of phases "A" through "H," it is only necessary to provide means to initiate and also terminate the application of the motivating forces, that is, the heat application of refrigeration in the proper sequence.

This proper sequence is accomplished by the refrigeration phases commencing in response to the discharge phase of the other unit increasing the pressure in the main tank and the rise in temperature of the heat pump of the other unit by the opening of the valves 388 or 404; the admission of heat is initiated by the valves 370, 372 controlling the admission of burner fuel, opening in response to the refrigeration dropping the temperature of the heat exchanger associated therewith to a predetermined low temperature; the refrigeration phase ceasing in response to the other unit completing its discharge phase end/or the pressures in the tank and the reservoir approaching equality and, finally, the heat is turned off in one unit in response to the refrigeration coil of the other unit dropping to a predetermined low temperature during its refrigeration phases.

As will become apparent hereinafter, the apparatus shown in Figure 3 may, during operation have the phases of each particular unit staggered with respect to the other within predetermined limits. However, in order to expedite an understanding of the over-all operation of the apparatus, there has been illustrated in Figures 4 through 19 a satisfactory sequence of apparatus operations or phases as a whole as related to the phase relations of the individual units. It will be readily appreciated that the sequence of operational steps shown in Figures 4 through 19 is only one of many analogous sequences of which the flexibility of the apparatus lends itself capable, and that each of these many possible sequences will produce the desired end result, that is, the separation and extraction of the less volatile components of hydrocarbon gas mixtures. In Figures 4–19, the position of the valves in each unit is indicated by the symbols $V_o$ and $V_c$, which symbols indicate respectively, the valves being open or closed.

In order to facilitate the description of the drawings, the unit appearing to the left side of the main tank in Figure 3 will be referred to as the left unit, and the unit appearing to the right side of the main tank will be referred to as the right unit, while frequent reference will be made to Figure 20 to explain the particular phase or condition prevailing in either of the units.

Figure 4:
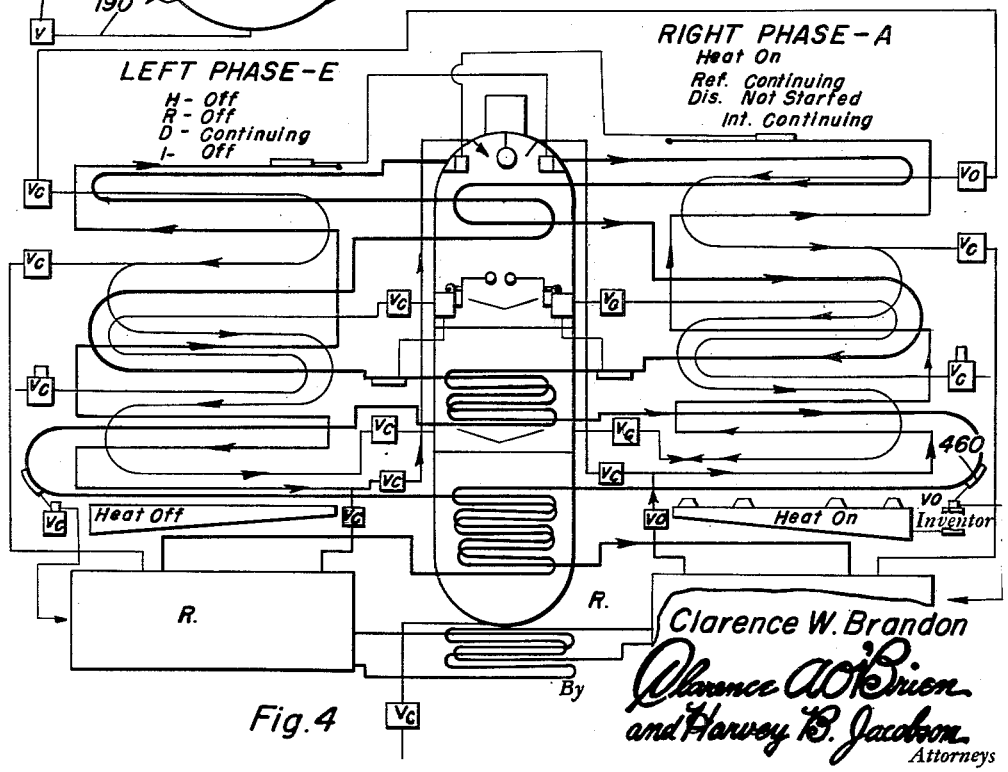

As shown in Figure 4, the apparatus is in actual continuous operation and at the particular interval of time illustrated in Figure 4, the left unit is in phase "E" and the right unit is in phase "A." Thus, the right unit burner 362 has just turned on in response to the refrigeration coil 382 dropping to a predetermined low temperature by means of the thermal actuator 460 opening the valve 370, and at this particular time refrigeration flow is still continuing along with the intake of the heat pump from the conduit 330 and the reservoir 322. In addition, the heat and the refrigeration are both off on the left unit. However, discharge from the heat pump is still continuing from the recent application of heat to the left unit.

Figure 5:
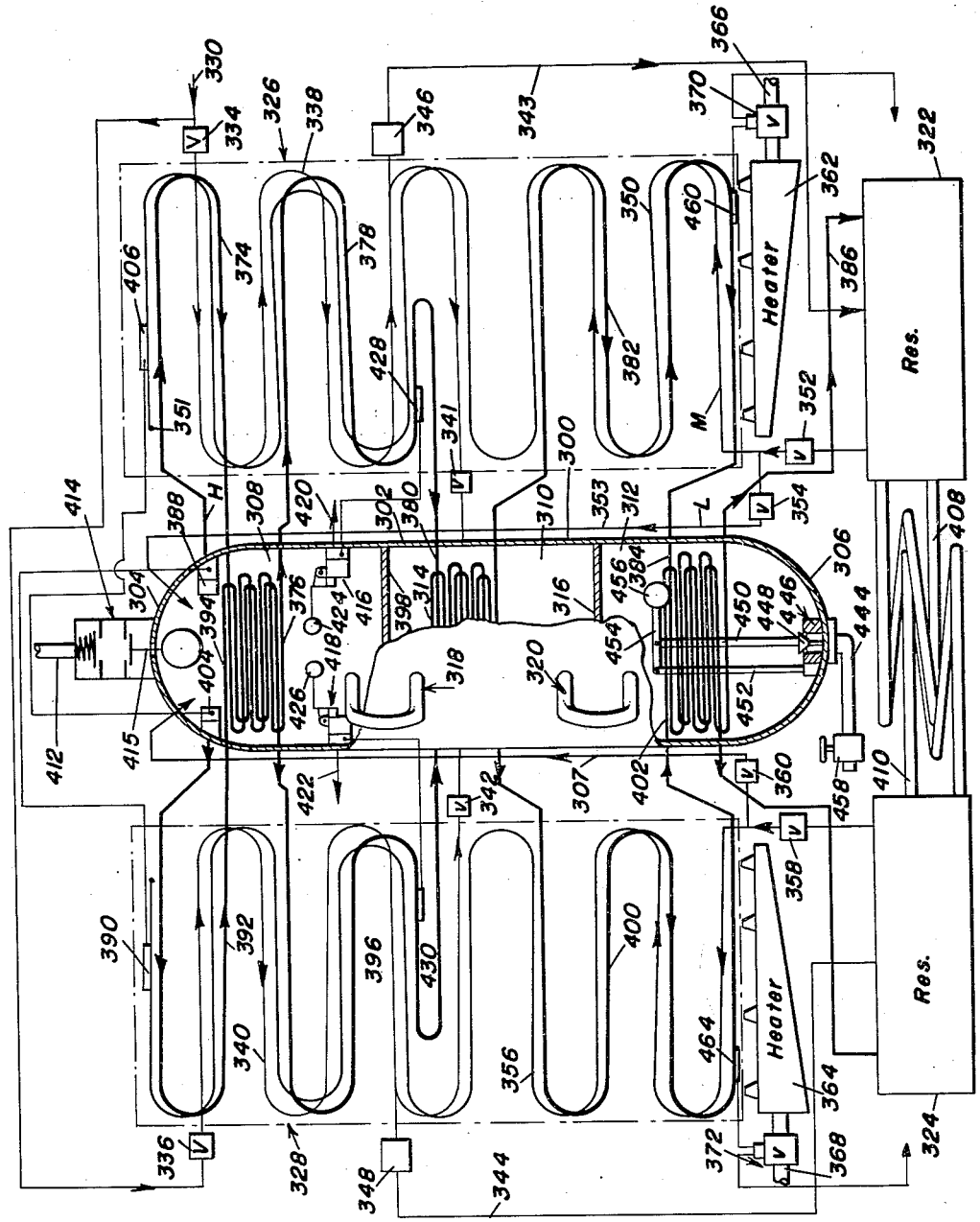

In Figure 5, the left unit remains in phase "E," but the right unit has entered phase "B" as the refrigeration flow has ceased or has substantially stopped due to the diminuation of discharge from the left unit and/or because the pressure has increased in the reservoir 322.

Figure 6:
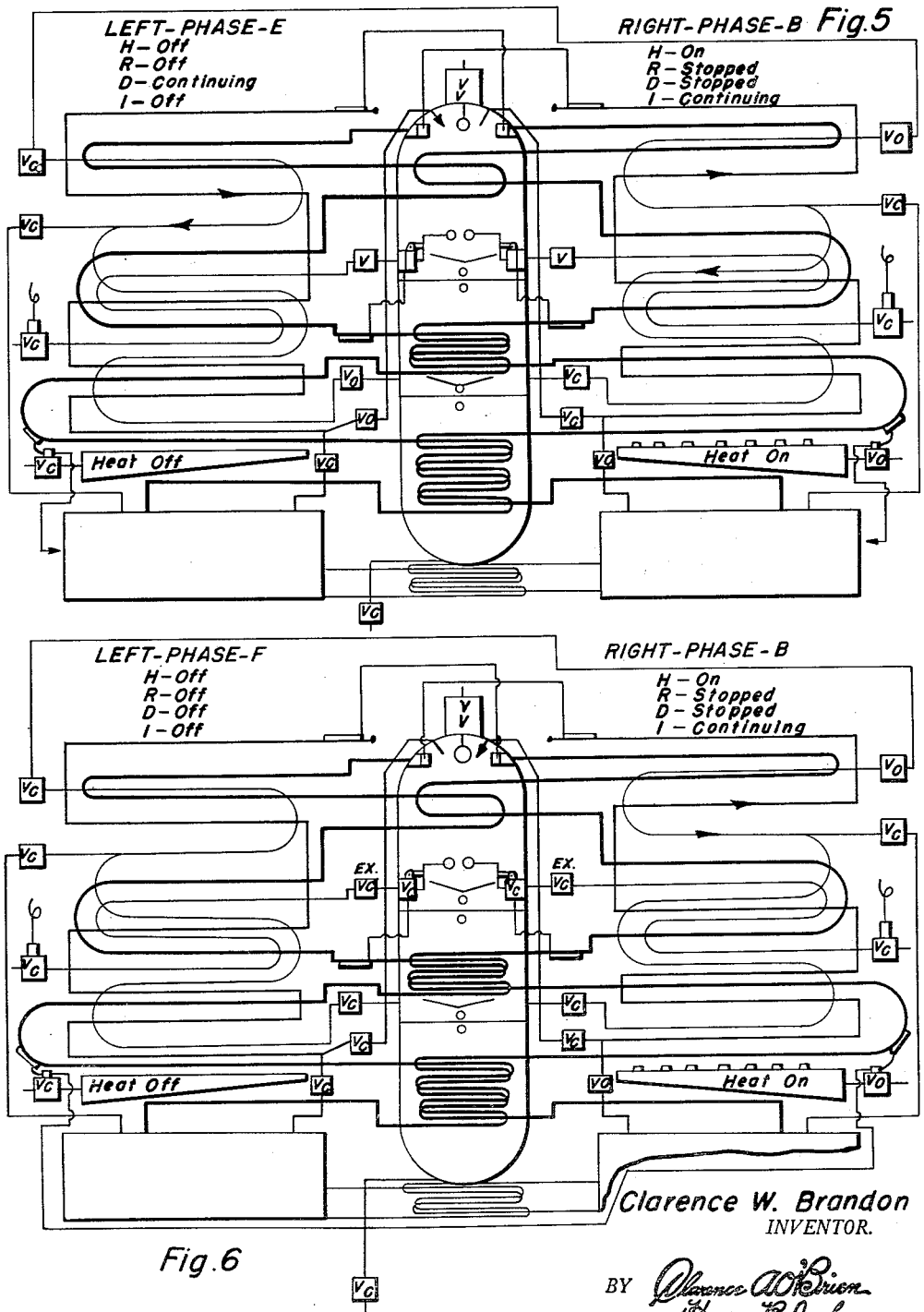

The next operational stage of the apparatus is shown in Figure 6 and illustrates the right unit continuing in phase "B," while the left unit has entered phase "F." Accordingly, the heat remains on the right unit with the heat pumps still drawing in their charges, and the discharge of the heat pumps associated with the left unit has stopped.

Figure 7:
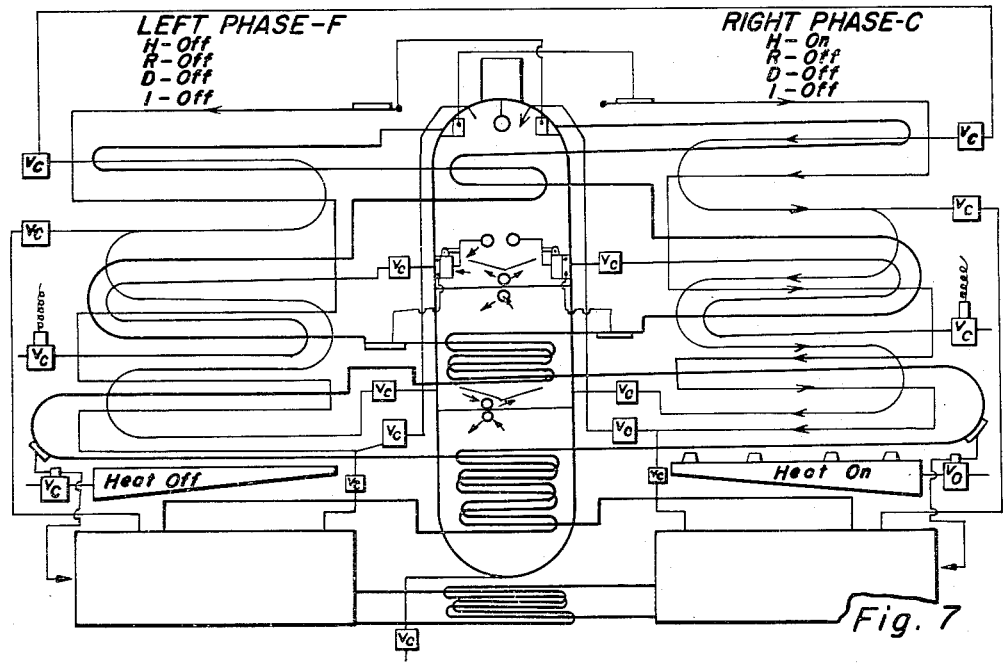

Figure 7 differs from Figure 6 only in the fact that the intake of the right unit has ceased, the left unit being in phase "F" and the right unit in phase "C."

Figure 8:
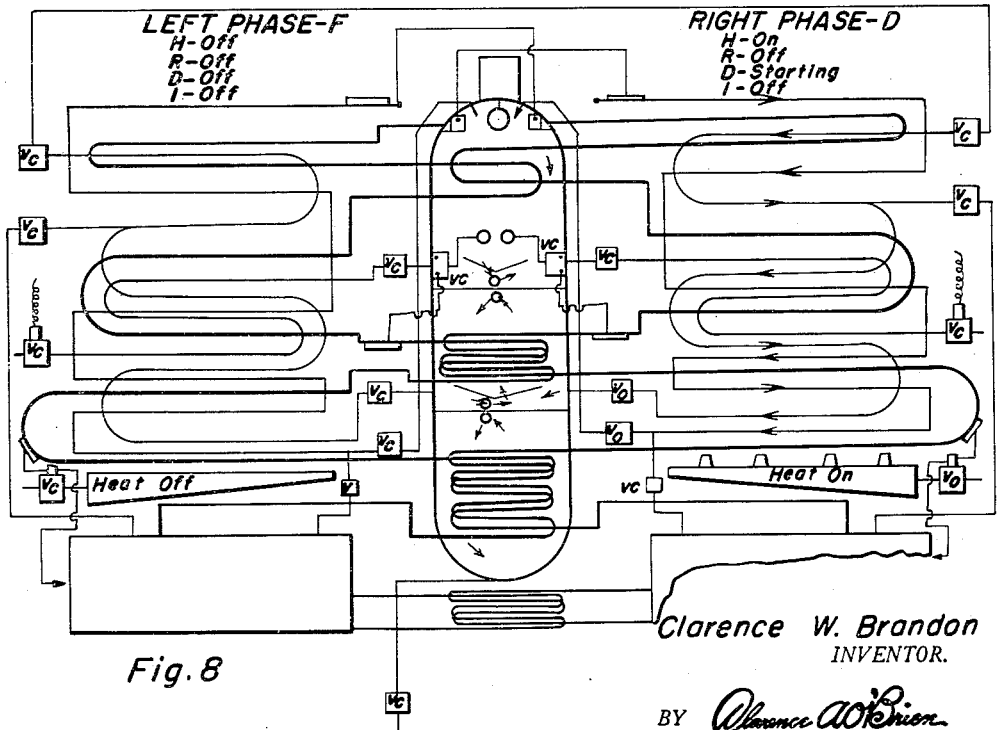

Figure 8 denotes the fact that under the continuation of the application of heat in the right unit that the discharge of the heat pumps has commenced and that, therefore, the right unit is in phase "D," while the left unit remains in phase "F."

Figure 9:
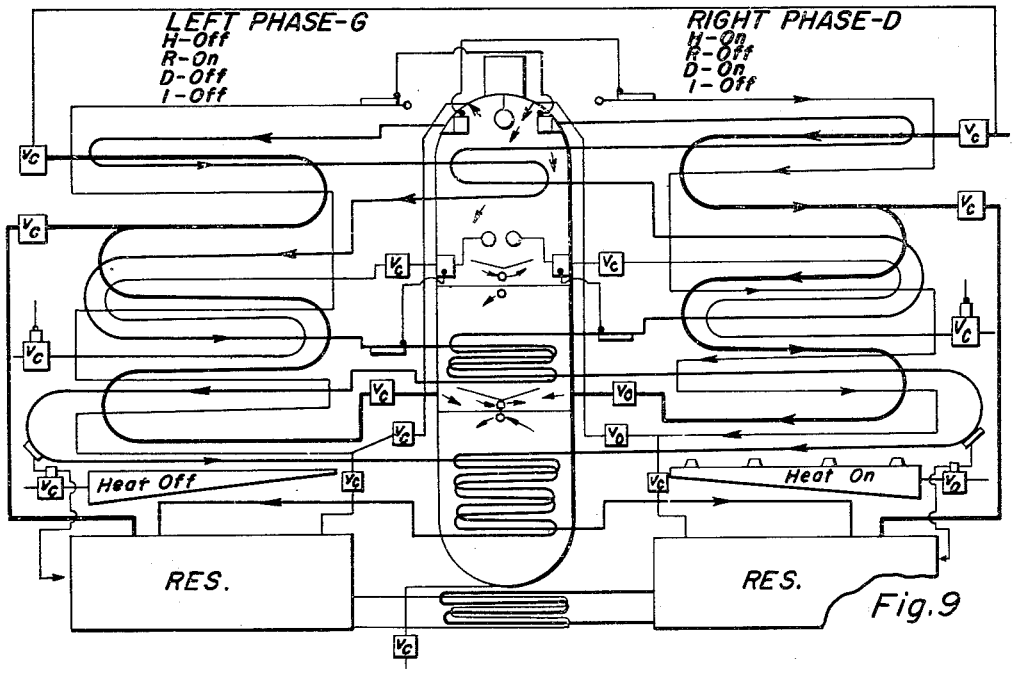

In Figure 9, the right unit remains in phase "D," while refrigeration flow has commenced in the left unit. As described above, the left unit enters phase "G" in response to the opening of valve 404, which valve has opened because of the rise of pressure within the main tank due to the discharge of the right unit together with the increase in temperature of the heat pump coil 350 as sensed by the thermal actuator 406. Accordingly, in this view, the left unit is in phase "G" and the right unit is in phase "D."

Figure 10:
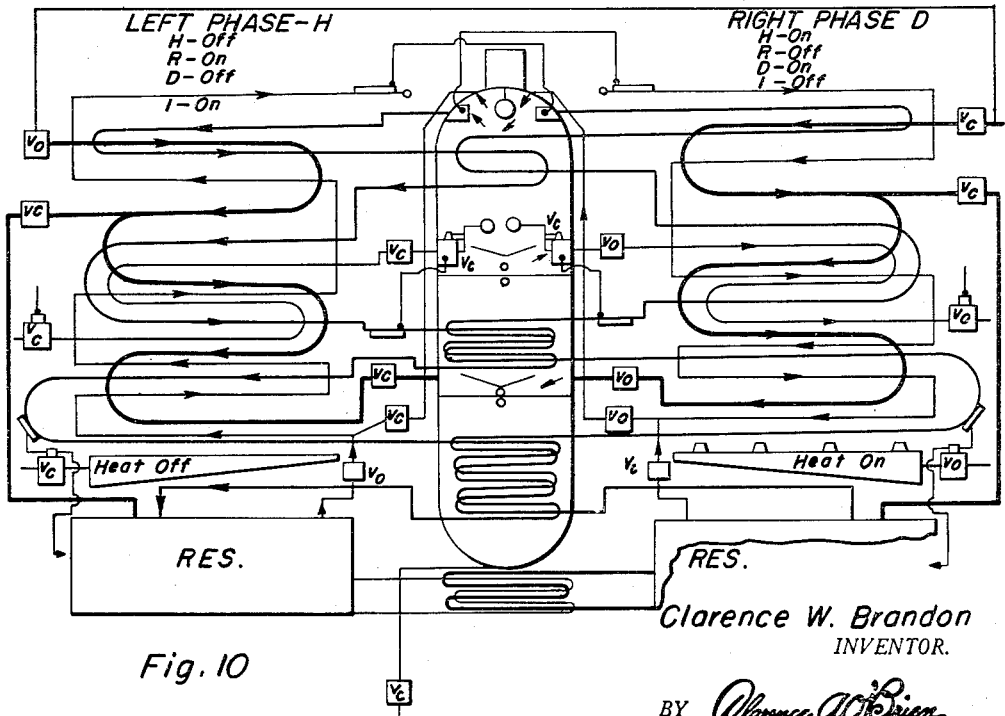

Figure 10 differs from Figure 9 only in that the intake of the heat pumps has commenced in the left unit in response to the continuation of the refrigeration, the left unit being in phase "H" and the right unit in phase "D."

Figure 11:
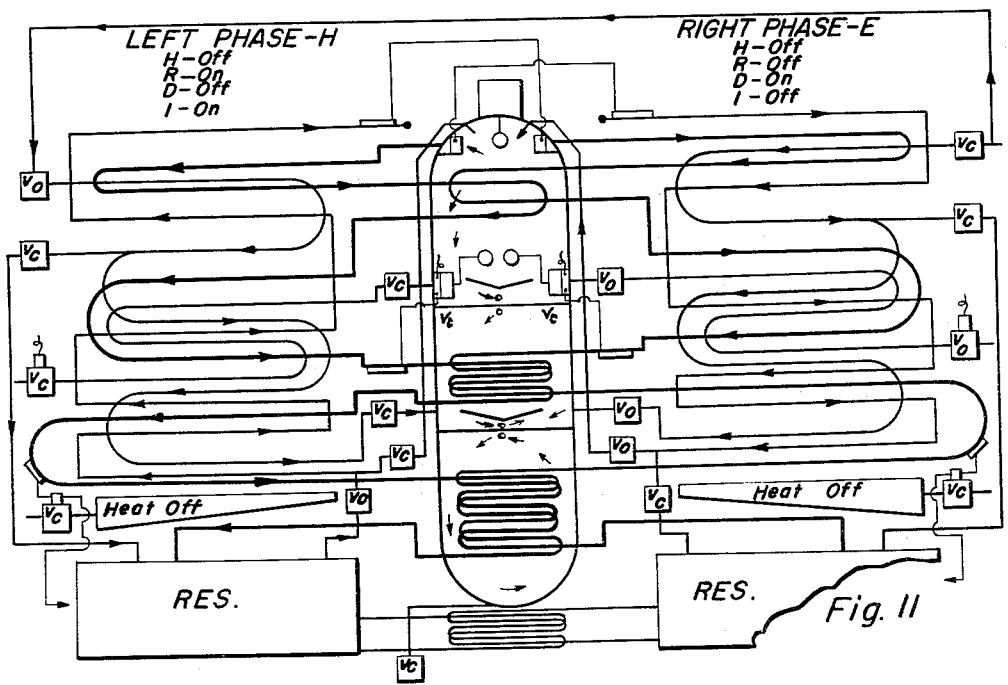

Figure 11 differs from Figure 10 in that the heat has been turned off from the right unit, which change is in repsonse to the valve 370 closing under the actuation of the thermal actuator 464 associated with the refrigeration coil 400 reaching a predetermined low temperature during the continued refrigeration of the left unit. Accordingly, in Figure 11 the right unit is in phase "E" and the left unit is in phase "H."

Figure 12:
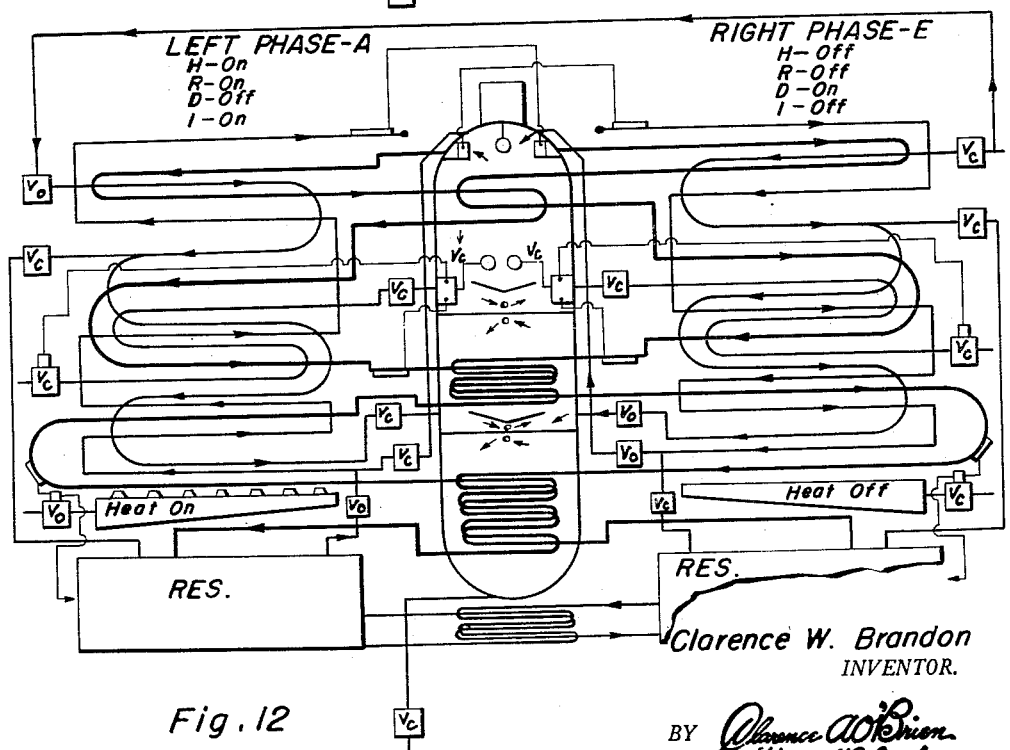

As shown in Figure 12, the heat has been turned on the left unit, which heat is turned on by the opening of the valve 372 in repsonse to the thermal actuator 464 and the refrigerating coil 400 reaching a lower temperature. Therefore, Figure 12 shows the left unit in phase "A" and the right unit in phase "E." It will be noted that Figure 12 differs from Figure 4 only in that the phases of the right and left units have been reversed, the left unit in Figure 12 being in precisely the same condition as the right unit was in during the operation step shown in Figure 4.

Figure 13:
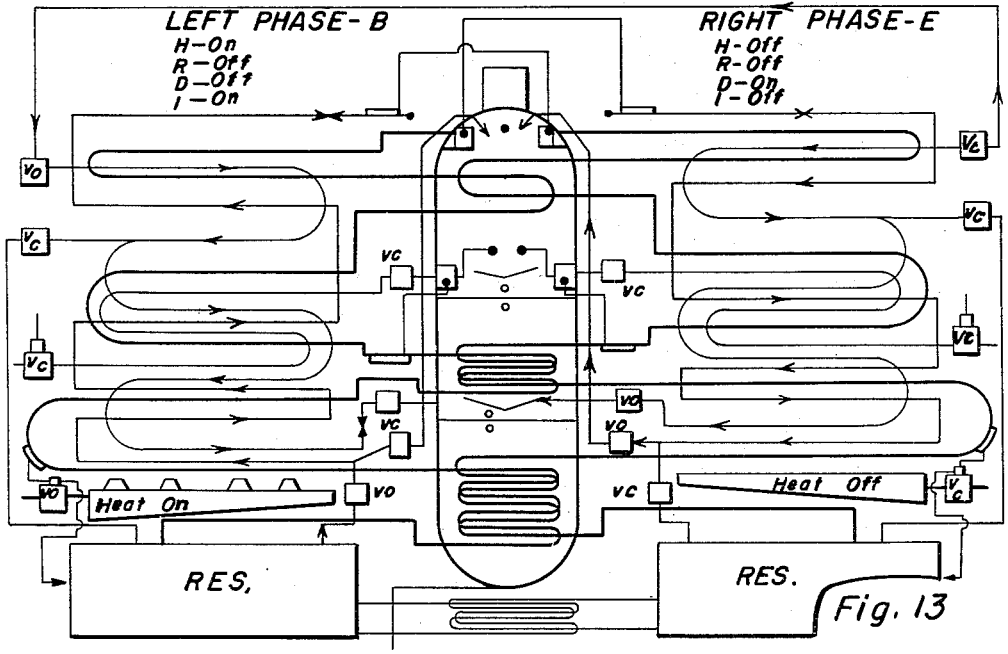

In Figure 13, the right unit remains in phase "E," while the left unit is now in phase "B" due to cessation of the refrigeration flow, such cessations being in response to the diminuation of the discharge from the right unit.

Figure 14:
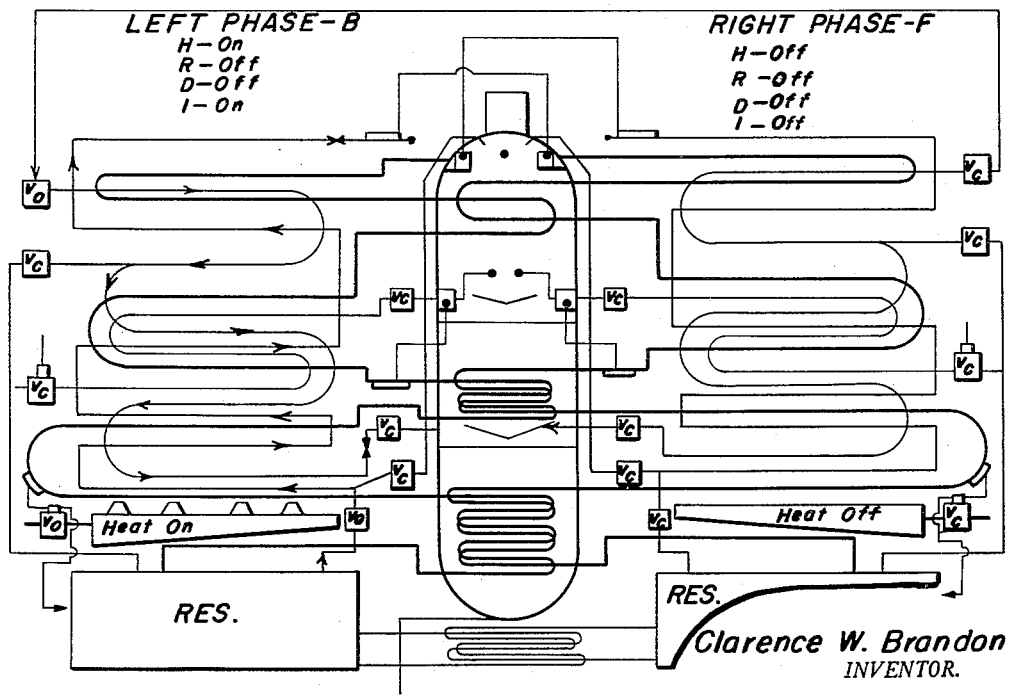

Figure 14 shows the left unit remaining in phase "B" and the discharge from the right unit as having stopped so that the right unit is in phase "F." It will be understood that the discharge of the right unit ceases in response to the discontinuing of the application of heat which is the motivation force for such discharge.

Figure 15 shows the right unit remaining in phase "F" with the intake of the left unit stopped so as to be in phase "C." It will be noted that the intake of the left unit stops in response to the cessation of the refrigeration of the left unit.

In Figure 16, the heat pumps of the left unit have begun discharging in response to the continued application of heat, so that the left unit is in phase "D" and the right unit in phase "F."

Figure 17:
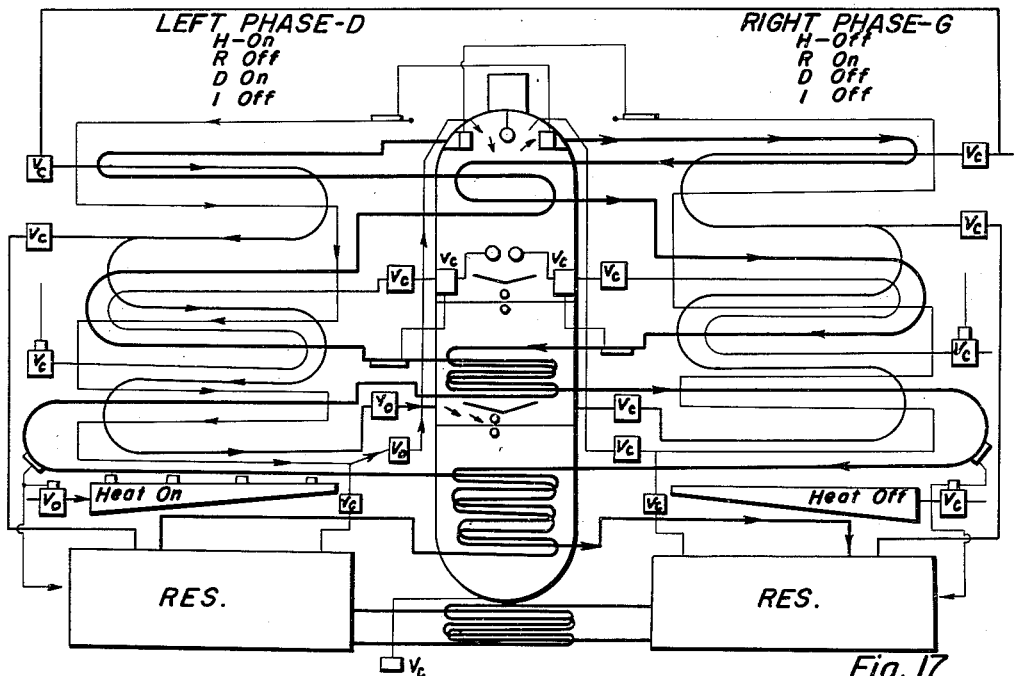

Passing from Figure 16 to Figure 17, it will be noted that the left unit remains in phase "D," while the refrigeration has commenced in the right unit, such refrigeration commencing in response to the discharge of the left unit and the rise in temperature of the heat pump coils, and, accordingly, the left unit is in phase "D" and the right unit in phase "G."

Figure 18:
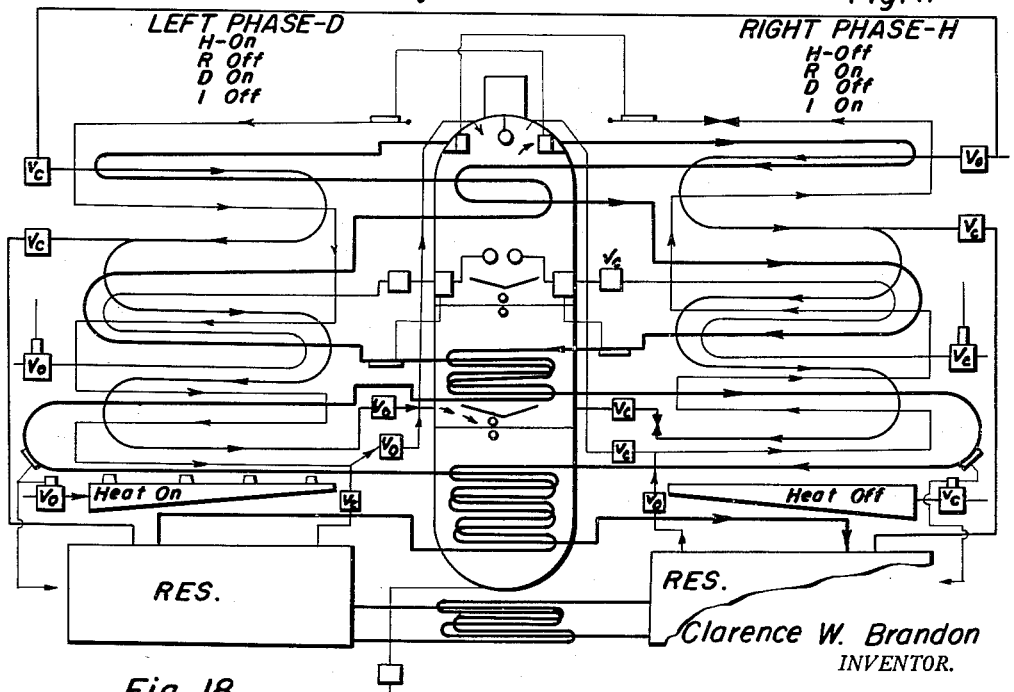

Figure 18 shows the heat pumps of the right unit drawing in fresh charges of fluid in response to the continuation of the conditions prevailing in the apparatus shown in Figure 17; that is, by the continuation of the refrigeration of the right unit, so that the left unit is in the phase "D" and the right unit is in phase "H."

Figure 19 shows the right unit continuing in phase "H," while the left unit is in phase "E," it being noted that the left unit enters phase "E" in response to the heat on that side being turned off, and it will be recalled that the heat on the left side is turned off in response to the refrigeration coil associated with the right unit being cooled to a predetermined low temperature.

Comparing the transition between the operational conditions shown in Figures 11 and 12, in which the phase conditions of the units are reversed, it will be seen that the apparatus, as its next step from that shown in Figure 19, will return to the condition shown in Figure 4 by the heat being turned on in the right unit, and that the heat will be turned on in response to the refrigeration coil of the right unit dropping to a predetermined low temperature. Accordingly, it will be seen that during the continuous operation of the apparatus that a substantially continuous stream of raw material is introduced into the main tank through the operation of the right and left units, as it will be seen upon inspection of the figures that either one or the other of the units is discharging into the main tank in Figures 4 and 5, 8 through 13, and 16 through 19. Since a substantially continuous stream of raw material is being fed into the main tank, it follows that a substantially continuous stream of rectified products is drawn off of the main tank for direct transit to points of consumption, or either near or remote storage as desired.

Taken together with the Figures 4-20, inclusive, Figure 21 illustrates diagrammatically the flexibility of the synchronous adjustability of the phase relations between the right and left units, illustrating particularly the interdependence of the cycles of the right and left units and the duration of the motivation forces; that is, the application of heat or refrigeration to each of the units, as well as the duration of the effect, that is, intake and discharge of each of the units.

In Figure 21, the time sequence of the phases of the units progresses downward from the top of the diagram, which units are designated as the left unit and the right unit, and are respectively on the left and right hand sides of the diagram with a pair of closely spaced vertical lines dividing therebetween. For each unit, the instant of a change of phase is indicated by a short, horizontal line designated by lower case letters, which lower case letters agree with the capital letters designating the phase introduced. For example, the lower case "g" at the top of the right unit column indicates the start of refrigeration flow in the right unit, which, it will be recalled, initiates phase "G." It will be evident, then, that phase "G" in the right unit continues between the instants of phase change "g" and "h" which latter instant ushers in phase "H" in an analogous manner.

In order to simplify the following explanation and in order to avoid the necessity for frequent reference to Figure 20, the changes occurring in the units are set forth in Figure 21, in abbreviated form. Such changes are set forth in rectangles attached to the horizontal lines designated by the lower case letters. In the rectangles, "Heat on" signifies that the heat continues on through that particular phase change, while "Heat starts" (or "Heat stops") makes apparent the actual change occurring between the phases. In a similar manner, changes in refrigeration, intake and discharge are denoted in the rectangles.

In addition, the duration of each of the motivating forces and the effects thereof of both of the units is indicated along the side edges of the diagram shown in Figure 21, and to facilitate comparison of the phase relations existing between the left unit and the right unit, the beginning and ending of complete cycles of both the left and the right units are indicated, it being assumed that a complete cycle for either unit begins with the start of phase "A" and terminates with the end of phase "H."

It will have been observed from the foregoing that the refrigeration phases of the right unit occur during such time that the valve 388 is opened, the operation of which valve, in addition to depending upon the pressure prevailing within the main tank, also depends upon the temperature of the heat pump coil 356 as determined by the thermal actuator 390. Accordingly, it will be understood that by means of the valve 388 and the thermal actuator 390 the refrigeration phases of the right unit may be adjustably predetermined for initiation of these phases upon the temperature of the heat pump coil 356. The dependence of the initiation of phase "G," that is, the starting of the refrigeration of the right unit, upon the temperature of the heat pump coil 356 has been illustrated graphically in Figure 21 by means of a vertical line 466 which may be conveniently termed an "adjustment line" appearing to the left of the pair of vertical lines separating the left unit from the right unit, which line extends through phases "B," "C," "D" and "E" of the left unit. This line extending downwardly in Figure 21 represents, as it extends downwardly, the time interval of progressively increasing temperature of the heat pump coil 356, and since the initiation of phase "G" for the right unit is adjustably dependent upon any predetermined temperature of the heat pump coil 356, this fact is brought out diagrammatically by the dashed line 468 commencing from the "adjustment line" and terminating at an arrowhead at the start of phase "G." It will be understood that within certain performance limitations of the apparatus that the end of the dash line remote from the arrowhead thereof is adjustable along the "adjustment line" by proper setting of the actuator 390. However, it will be seen that the dash line is so positioned in the drawing as to be correlative to the sequence of phase changes in relation to each other as shown in Figures 4 through 19, Also to left of the pair of vertical lines separating the left unit from the right unit in Figure 21 is a second "adjustment line" 470 extending through phases "E" and "F," which "adjustment line" delineates the interval of cooling of the heat pump coil 356, and which line is connected by an arrowheaded dashed line 472 to the right unit for the initiation of phase "B." In a manner analogous to that set forth in the preceding paragraph, the dashed arrow 472 signifies the adjustability of the initiation of phase "B" along the adjustment line associated therewith, the same being shown in the position correlative with the operation sequences shown in Figures 4 through 19, inclusive.

A third adjustment line 474 appears to the left of the pair of vertical lines separating the left unit from the right unit, which line extends through the phases "E" through "C," inclusive, of the left unit and signifies the interval of the progressive drop in temperature of the refrigerating coil 464 associated with the left unit. It will be recalled that the thermal actuator 464 is thermally associated with the refrigerating coil 400 and that the thermal actuator 464 is operatively connected to the valves 372 and 370, which respectively controls the admission of fuel to the left unit and the right unit by the opening or closing of these valves, respectively. The dependence of the right unit upon the left unit for the cessation of the application of heat to the right unit, that is, by the turning off of valve 370, is indicated by the dashed arrow 476 connecting the third "adjustment line" 474 to the point of initiation of phase "E" for the right unit, which dashed arrow is shown in the position correlative to the operational sequences shown in Figures 4 through 19, inclusive, it being understood that within certain performance limitations the dashed arrow is adjustable along the third "adjustment line." The dependence of the initiation of the application of heat to the left unit upon the refrigeration attained within the refrigerating coil 400 of the left unit is indicated graphically by a short arrow drawn from the third "adjustment line" 474 to the point signifying initiation of phase "A" for the left unit.

In a perfectly analogous manner, "adjustment lines" have been shown to the right of the pair of vertical lines separating the left unit from the right unit, which lines, by means of the thermal actuators 406 and 460, control the initiation of phase "G" and the termination of phase "A," together with the initiation of phase "A" and the termination of phase "D." Thus, it will be seen that of the four necessary steps for the initiation and termination of both the heat and refrigeration phases during one cycle of one unit's operation, three of these control steps are absolutely tied in with and dependent upon the phase sequence of the other unit, the turning on of the burner in one unit being the only step wherein such unit is dependent upon an internal condition in itself for the initiation of such step. It follows that not only is the operation of the entire assembly perfectly integrated with the independent functions of the right and left units, but that the means by which the effects of both units are integrated also serves to lend great flexibility to the sequence of operational steps performed by the entire assembly.

Thus, it will be seen that by a proper selection of or adjustment of the thermal actuators 390, 406, 460 and 464 a wide range of relative phase relations between the units may be had so that the most efficient relation may be selected for the particular refining problem at hand.

Since the phases of the right and left units are positively interrelated, as set forth hereinbefore, it might be suspected that it would be difficult to initiate or start the apparatus. This, fortunately, is not the case, and it is an important advantage of the embodiment shown in Figure 3 that the same may be initially set into operation by a simple and easy procedure so that the apparatus will thence operate in an entirely automatic manner as outlined above. The case of initiating the operation of the apparatus will be appreciated upon reference to Figure 22, in which the essence of the priming or starting step is illustrated diagrammatically.

It will be noted that the compartments of the main tank 300 are shown as being partially filled and the reservoirs 322 and 324 partially filled with volatile liquid having the character of the liquid with which the tank 300 will be filled during continuous operation of the apparatus. In addition, the heat pump coil 350 is likewise filled with liquid. The operation is then initiated by the manual opening of the valve 370, which, it will be noted, is the sole step in which a unit need be self-initiating and is, in fact, the essence of the ease with which operation is commenced, so that the heat pump coil 350 discharges the contents thereof into the tank 300 to raise the pressure therein. The valve 404 then opens in response to the increase of pressure in the tank 300 and the rise in temperature of the coil 350, and the refrigeration of the left unit commences. Accordingly, it will be seen that the right unit is then in phase "D" and the left unit in phase "G," as in Figure 9, which, it will be recalled, is one of the conditions of the apparatus during continuous operation, and that the valve 370 will be thence operated to turn off the heater 362 by means of the thermal actuator 464, as shown in Figure 10, it being apparent that the apparatus will continue to function steadily as shown in the sequence of drawings in Figures 4 through 19.

It will be understood that throughout the entire cycle of the apparatus, the fractionating assemblies 318 and 320 will be in operation to effect rectification of the raw mixture fed into the apparatus so that the rectified products may be drawn off through the lines 420 and 422 from the upper chamber and similar discharge lines that are connected in a similar manner to lower chambers. It is to be further understood that the Figures 1–3 are illustrative of a means of fractionating a hydrocarbon mixture, yet the process can be used to rectify other types of products as desired.

Although the various forms of the invention and the modes of operation thereof have been set forth in considerable detail, this has been done for the purpose of conveying a full and complete understanding of the same, and such specific description is not to be considered as indicative of a limitation on the actual breadth of the invention. Obviously, the invention is of such a character as to be readily susceptible to numerous variations, both as to structure and method, without departing from the spirit of the invention, and, accordingly, the invention is to be measured by the appended claims.

What is claimed as new is as follows:

1. An apparatus for the recovery of lighter fractions from high pressure hydrocarbon gas from oil wells which comprises; a tank having a pair of spaced apart impervious partitions dividing said tank into an intermediate compartment and separated upper and lower end compartments, supply means for delivering under pressure hydrocarbon gas into said intermediate compartment, a pair of fractionating assemblies each connecting the intermediate compartment with one of said end compartments, means for withdrawing in liquid phase lighter and heavier fractions of the condensate from the upper and lower end compartments respectively, one of said fractionating assemblies comprising horizontal upper and lower tubes each having a series of vapor-liquid equilibrium chambers therein, and means establishing adjustable communication between selected portions of the upper and lower tubes whereby to vary the number of equilibrium chambers in operation; said tubes communicating with different compartments.

2. An apparatus for the recovery of lighter fractions from high pressure hydrocarbon gas from oil wells which comprises; a tank having a pair of spaced apart impervious partitions dividing said tank into an intermediate compartment and separated upper and lower end compartments, supply means for delivering under pressure hydrocarbon gas into said intermediate compartment, a pair of fractionating assemblies each connecting the intermediate compartment with one of said end compartments, means for withdrawing in liquid phase lighter and heavier fractions of the condensate from the upper and lower end compartments respectively, and means for applying heat to one of said fractionating assemblies.

3. An apparatus for the recovery of lighter fractions from high pressure hydrocarbon gas from oil wells which comprises; a tank having a pair of spaced apart impervious partitions dividing said tank into an intermediate compartment and separated upper and lower end compartments, supply means for delivering under pressure hydrocarbon gas into said intermediate compartment, a pair of fractionating assemblies each connecting the intermediate compartment with one of said end compartments, means for withdrawing in liquid phase lighter and heavier fractions of the condensate from the upper and lower end compartments respectively, means for applying heat to one of said fractionating assemblies, and further means for controlling said means for applying heat in response to temperature and pressure in said tank.

4. An apparatus for rectifying the components of a low pressure hydrocarbon gas mixture comprising a tank having an intermediate and a pair of end compartments, a fractionating means for each end compartment communicating the latter with said intermediate compartment, a pair of heat exchange units, means for supplying a hydrocarbon gas to each unit, means in each unit for delivering said gas to said tank, means in each unit for educting liquid from each of said tank compartments.

5. The combination of claim 4 including means for causing flow of said hydrocarbon gas operatively connected with said supplying means.

6. The combination of claim 4 including means for causing flow of said hydrocarbon gas operatively connected with said educting means.

7. The combination of claim 4 including means for causing flow of said hydrocarbon gas operatively connected with said supplying and educting means.

8. The combination of claim 4 including means for causing flow of said hydrocarbon gas operatively connected with said supplying means, said flow causing means including a heat pump.

9. The combination of claim 4 including control means for alternately applying heat to a gas supply means of each unit.

10. The combination of claim 4 including a reservoir for each unit, means connecting each of said first mentioned supply means to a reservoir and means connecting each reservoir to said tank.

11. The combination of claim 4 including a reservoir for each unit, means connecting each of said first mentioned supply means to a reservoir and means connecting each reservoir to said tank, said last means including a heat pump.

12. An apparatus for rectifying the components of a low pressure hydrocarbon gas mixture comprising a tank having an intermediate and a pair of end compartments, means for fractionating hydrocarbons connected to and communicating each end compartment with said intermediate compartment, a pair of heat exchange units, means for supplying a hydrocarbon gas to each unit, means in each unit for delivering said gas to said tank, means in each unit for educting liquid from each of said tank compartments, a pair of refrigerating means each in one of said educting means in heat exchange relation with said tank and with the supply means in said units.

13. The combination of claim 4 including a reservoir for each unit, means connecting each of said first mentioned supply means to a reservoir and means connecting each reservoir to said tank, a pair of refrigerating means each in one of said educting means in heat exchange relation with said tank and with the supply means in said units and with said reservoirs.

14. The combination of claim 12 including control means for causing operation of said refrigerating means in alternation.

15. The combination of claim 4 including a reservoir for each unit, means connecting each of said first mentioned supply means to a reservoir and means connecting each reservoir to said tank, means for cooling said reservoirs.

16. The combination of claim 12 including means for discharging a liquid fraction from one of said compartments and control means for said last means responsive to the temperature of said refrigerating means.

17. An apparatus for rectifying the components of a low pressure hydrocarbon gas mixture comprising a tank having an intermediate and a pair of end compartments, means for fractionating hydrocarbons connected to and communicating each end compartment with said intermediate compartment, a pair of heat exchange units, a reservoir for each of said units, a gas supply means for said tank extending through each of said units, a refrigerating means for each unit connected to the reservoir of that unit and to said tank, a gas feed means connecting each reservoir with said tank, a heat pump coil in each unit communicating with the reservoir of that unit and with the gas feed means of that unit, means for applying heat to the heat pump coil of each unit, means for controlling the heat applying means of each unit from the refrigerating means of that unit, means controlling the refrigerating means of each unit from the refrigerating means of the other unit whereby the refrigerating cycle will operate in alternation.

References Cited in the file of this patent

UNITED STATES PATENTS 1,808,087     Urquhart _____ June 2, 1931